(12) United States Patent
Lu

(10) Patent No.: US 11,394,313 B2
(45) Date of Patent: Jul. 19, 2022

(54) POWER CONVERSION APPARATUS HAVING SEMICONDUCTOR MODULES EACH INCLUDING SERIES-CONNECTED SEMICONDUCTOR SWITCHES AND OUTPUT TERMINAL COUPLED TO NODE CONNECTING SEMICONDUCTOR SWITCHES, AND OUTPUT BAR COUPLING OUTPUT TERMINALS OF SEMICONDUCTOR MODULES

(71) Applicant: FUJI ELECTRIC CO., LTD., Kanagawa (JP)

(72) Inventor: Hong-fei Lu, Hino (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 112 days.

(21) Appl. No.: 17/064,718

(22) Filed: Oct. 7, 2020

(65) Prior Publication Data

US 2021/0021204 A1 Jan. 21, 2021

Related U.S. Application Data

(63) Continuation of application No. 16/253,598, filed on Jan. 22, 2019, now Pat. No. 10,840,818.

(30) Foreign Application Priority Data

Mar. 2, 2018 (JP) .............................. JP2018-037645

(51) Int. Cl.
*H02M 7/00* (2006.01)
*H02M 1/32* (2007.01)
(Continued)

(52) U.S. Cl.
CPC .............. *H02M 7/003* (2013.01); *H02M 1/32* (2013.01); *H02M 7/537* (2013.01); *H02M 1/0061* (2013.01)

(58) Field of Classification Search
CPC ......... H02M 7/537; H02M 7/003; H02M 7/48
See application file for complete search history.

(56) References Cited

U.S. PATENT DOCUMENTS 5,327,008 A 7/1994 Djennas et al.
5,528,073 A 6/1996 Gilmore
(Continued)

FOREIGN PATENT DOCUMENTS

GB 2541966 3/2017
JP 2013-042663 2/2013
JP 2016-213945 12/2016

OTHER PUBLICATIONS

Japanese Office Action for Japanese Pat. Appln. No. 2018-037645 dated May 22, 2018.

*Primary Examiner* — Gustavo A Rosario-Benitez
(74) *Attorney, Agent, or Firm* — IPUSA, PLLC

(57) ABSTRACT

A power conversion apparatus includes N semiconductor modules respectively including a switch part including first and second semiconductor switches coupled in series, and an output terminal coupled to a node that connects the first and second semiconductor switches, where N is an integer greater than or equal to 3, wherein the N semiconductor modules are arranged so that the output terminals thereof are adjacent to each other. The power conversion apparatus further includes an output bar to couple the output terminals of the N semiconductor modules so that a parasitic inductance of a current path coupling the output terminals of first and second semiconductor modules among the N semiconductor modules, and a parasitic inductance of a current path coupling the output terminals of the first and third semiconductor modules among the N semiconductor modules, are approximately balanced.

11 Claims, 12 Drawing Sheets

(51) Int. Cl.
*H02M 7/537* (2006.01)
*H02M 1/00* (2006.01)

(56) References Cited

U.S. PATENT DOCUMENTS

| | | | |
|---|---|---|---|
| 5,616,955 A | | 4/1997 | Yamada et al. |
| 5,683,944 A | * | 11/1997 | Joiner ............... H01L 23/49503 |
| | | | 257/676 |
| 6,091,401 A | * | 7/2000 | Chen ................... G06F 3/03548 |
| | | | 345/166 |
| 9,967,991 B2 | | 5/2018 | Ichikawa |
| 2002/0034089 A1 | | 3/2002 | Mori et al. |
| 2007/0176211 A1 | * | 8/2007 | Kunze ................. B81C 1/00142 |
| | | | 257/232 |
| 2013/0039100 A1 | | 2/2013 | Kazama et al. |
| 2013/0049814 A1 | | 2/2013 | De Rooij et al. |
| 2013/0300492 A1 | | 11/2013 | Zhao et al. |
| 2016/0226396 A1 | | 8/2016 | Hattori et al. |
| 2016/0373017 A1 | * | 12/2016 | Mima ................... H02M 7/003 |
| 2017/0263535 A1 | * | 9/2017 | Nakano ................ H05K 1/0213 |
| 2018/0233918 A1 | | 8/2018 | Nishida |
| 2019/0333843 A1 | * | 10/2019 | Hiramitsu ......... H01L 23/49568 |
| 2019/0386577 A1 | * | 12/2019 | Ishii ........................ H02M 1/44 |

* cited by examiner

POWER CONVERSION APPARATUS HAVING SEMICONDUCTOR MODULES EACH INCLUDING SERIES-CONNECTED SEMICONDUCTOR SWITCHES AND OUTPUT TERMINAL COUPLED TO NODE CONNECTING SEMICONDUCTOR SWITCHES, AND OUTPUT BAR COUPLING OUTPUT TERMINALS OF SEMICONDUCTOR MODULES

CROSS-REFERENCE TO RELATED APPLICATION

This application is a continuation application of U.S. patent application Ser. No. 16/253,598 filed on Jan. 22, 2019, which is based upon and claims priority to Japanese Patent Application No. 2018-037645, filed on Mar. 2, 2018, the entire contents of which are incorporated herein by reference.

BACKGROUND OF THE INVENTION

1. Field of the Invention

The disclosures herein are related to a power conversion apparatus.

2. Description of the Related Art

One example of a conventional power conversion apparatus includes a plurality of semiconductor modules respectively including a plurality of switching elements, a heating block having a surface provided with the plurality of semiconductor modules, and cooling fins provided on an opposite surface of the heating block. The power conversion apparatus further includes bypass capacitors or snubber capacitors electrically connected to the plurality of semiconductor modules, and a gate drive device that sends a control signal to the plurality of switching elements. In this example, a longitudinal direction of the semiconductor module is arranged to face a direction perpendicular to a direction in which cooling air passes between the cooling fins. Such a power conversion apparatus is proposed in Japanese Laid-Open Patent Publication No. 2016-213945, for example.

In the proposed power conversion apparatus described above, terminals for outputting A.C. (Alternating Current) power of the plurality of semiconductor modules are linearly arranged in a row, and linear bus bars mutually connect input and output terminals of each of the plurality of semiconductor modules. The semiconductor module in many cases has a circuit configuration in which a switching element forming an upper arm and a switching element forming a lower arm are connected in series. For example, a circuit of a three-phase A.C. power conversion apparatus is formed by connecting 3 semiconductor modules in parallel. In this case, the semiconductor modules are linearly arranged in a row, and when the switching element forming the upper arm of the semiconductor module that is located at an end of the row is short-circuited due to a failure or the like and a short-circuit current flows, the short-circuit current flows to the switching element forming the lower arm of the semiconductor modules. Because the bus bars have resistance and parasitic inductance, the closer the switching element forming the lower arm of the semiconductor module is to the failed switching element forming the upper arm of the semiconductor module, the larger the short-circuit current becomes, and the farther away the switching element forming the lower arm of the semiconductor module is from the failed switching element forming the upper arm of the semiconductor module, the smaller the short-circuit current becomes.

For this reason, the short-circuit current flowing to the switching element forming the lower arm of the semiconductor module becomes unbalanced among the plurality of semiconductor modules, to thereby make it difficult to secure failure tolerance, or tolerance with respect to the short-circuit current of the power conversion apparatus. Similarly, it is difficult to secure the failure tolerance, or the tolerance with respect to the short-circuit current of the power conversion apparatus, when the switching element forming the lower arm is short-circuited due to a failure or the like.

SUMMARY OF THE INVENTION

Accordingly, it is an object in one aspect of the embodiments to provide a power conversion apparatus which can easily secure tolerance with respect to the short-circuit current.

According to one aspect of the embodiments, a power conversion apparatus includes N semiconductor modules respectively including a switch part including a first semiconductor switch and a second semiconductor switch that are coupled in series, and an output terminal coupled to a node that connects the first semiconductor switch and the second semiconductor switch, where N is an integer greater than or equal to 3, wherein the N semiconductor modules are arranged so that the output terminals of the N semiconductor modules are adjacent to each other; and an output bar configured to couple the output terminals of the N semiconductor modules so that a parasitic inductance of a current path of the output bar coupling the output terminal of a first semiconductor module among the N semiconductor modules and the output terminal of a second semiconductor module among the N semiconductor modules, and a parasitic inductance of a current path of the output bar coupling the output terminal of the first semiconductor module and the output terminal of a third semiconductor module among the N semiconductor modules, are approximately balanced.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

A description will now be given of a power conversion apparatus in each embodiment according to the present invention.

First Embodiment

Figure 1:
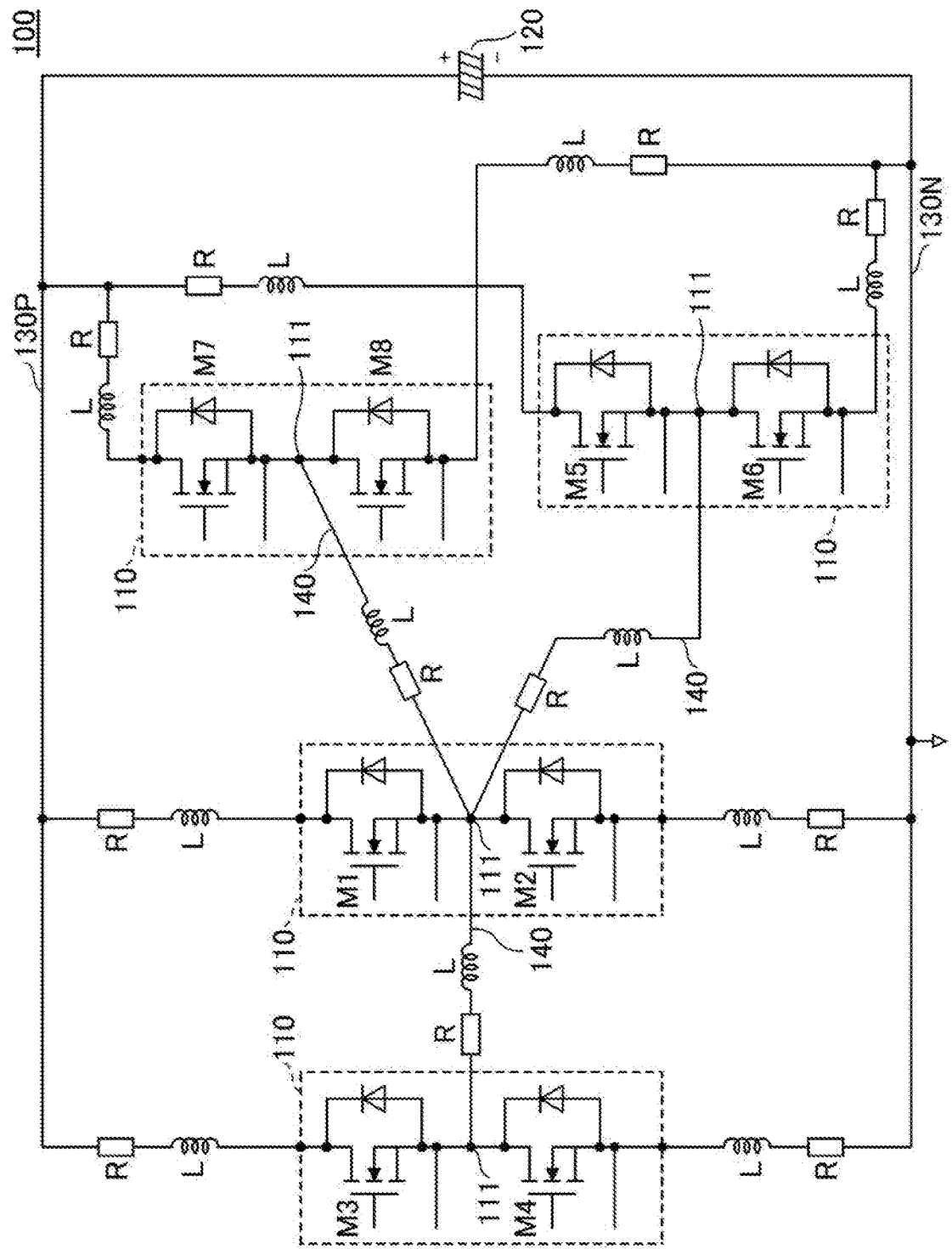
FIG. 1 is a diagram illustrating a circuit configuration of an example of a power conversion apparatus in a first embodiment.

FIG. 1 is a diagram illustrating a circuit configuration of a power conversion apparatus 100 in a first embodiment. The power conversion apparatus 100 includes 4 semiconductor modules 110, a capacitor 120, a P-bar 130P, an N-bar 130N, and an output bar 140.

For example, the power conversion apparatus 100 is a two-level inverter that outputs a U-phase among U-phase, V-phase, and W-phase of three-phase A.C. power. The configuration of the 2 power conversion apparatuses respectively outputting the V-phase and the W-phase may be the same as the configuration of the power conversion apparatus 100 outputting the U-phase.

The 4 semiconductor modules 110 include a pair of semiconductor switches M1 and M2, a pair of semiconductor switches M3 and M4, a pair of semiconductor switches M5 and M6, and a pair of semiconductor switches M7 and M8, respectively. The semiconductor switches M1, M3, M5, and M7 are included in upper arms, and the semiconductor switches M2, M4, M6, and M8 are included in lower arms. The semiconductor switches M1, M3, M5, and M7 are examples of first semiconductor switches, and the semiconductor switches M2, M4, M6, and M8 are examples of second semiconductor switches.

Each of the semiconductor switches M1 through M8 includes an N-channel MOSFET (Metal Oxide Semiconductor Field Effect Transistor), and a freewheel diode. A cathode of the freewheel diode is connected to a drain of the MOSFET, and an anode of the freewheel diode is connected to a source of the MOSFET, in each of the semiconductor switches M1 through M8. The freewheel diode may be a diode that is independent or separate from the MOSFET, a diode that is integrally formed on the MOSFET, a parasitic diode of the MOSFET, a Schottky barrier diode, or the like, for example. In this embodiment, the semiconductor switch uses the MOSFET, however, the semiconductor switch is not limited to a particular type as long as the semiconductor switch is a self-arc-distinguishing type semiconductor switch.

The drain of the MOSFET of each of the semiconductor switches M1, M3, M5, and M7 of the upper arms is connected to the P-bar 130P. The source of the MOSFET of each of the semiconductor switches M2, M4, M6, and M8 of the lower arms is connected to the N-bar 130N.

An output terminal 111 to output A.C. power is provided between the source of the MOSFET of the semiconductor switch M1 and the drain of the MOSFET of the semiconductor switch M2. An output terminal 111 is similarly provided between the semiconductor switches M3 and M4, between the semiconductor switches M5 and M6, and between the semiconductor switches M7 and M8. The 4 output terminals 111 are connected to the output bar 140.

Switching of the MOSFET of each of the semiconductor switches M1 through M8 is controlled by a PWM (Pulse Width Modulation) driving signal that is input to a gate of the MOSFET from a gate driving circuit that is not illustrated.

The capacitor 120 is connected between the P-bar 130P and the N-bar 130N, and is used as a D.C. power source. An output voltage of the capacitor 120 may be set according to the usage of the power conversion apparatus 100. Of course, a D.C. power source may be used in place of the capacitor 120. The capacitor 120 may also be used as a smoothing capacitor.

The P-bar 130P is a line that connects a positive polarity (+) terminal of the capacitor 120 to the drain of each of the semiconductor switches M1, M3, M5, and M7 in the upper arms of the semiconductor modules 110.

The N-bar 130N is a line that connects a negative polarity (−) terminal of the capacitor 120 to the source of each of the semiconductor switches M2, M4, M6, and M8 in the lower arms of the semiconductor modules 110. The P-bar 130P and the N-bar 130N are bus bars made from a metal plate made of copper, for example. Particular structures of the P-bar 130P and the N-bar 130N will be described later in conjunction with FIG. 2.

The output bar 140 connects the output terminal 111 of the 4 semiconductor modules 110. The output bar 140 is a bus bar made from a metal plate made of copper, for example, and is connected to a U-phase terminal of an A.C. motor. FIG. 1 illustrates an example in which the output bar 140 is provided between the output terminal 111 between the semiconductor switches M1 and M2 and the output terminal 111 between the semiconductor switches M3 and M4, between the output terminal 111 between the semiconductor switches M1 ad M2 and the output terminal 111 between the semiconductor switches M5 and M6, and between the output terminal 111 between the semiconductor switches M1 and M2 and the output terminal 111 between the semiconductor switches M7 and M8. The output bar 140 connects the output terminals 111 of the 4 semiconductor modules 110, so that the output bar 140 connects the output terminals 111 of each pair of adjacent semiconductor modules 110 by approximately the same distance. A particular structure of the output bar 140 will be described later in conjunction with FIG. 2.

For the sake of convenience, each of the P-bar 130P, the N-bar 130N, and the output bar 140 is illustrated in FIG. 1 as including a resistor R and an inductor L. The resistor R represents the resistance of each of the P-bar 130P, the N-bar 130N, and the output bar 140, and the inductor L represents the parasitic inductance of each of the P-bar 130P, the N-bar 130N, and the output bar 140. Hence, each of the P-bar 130P, the N-bar 130N, and the output bar 140 has the resistance and the parasitic inductance.

According to the power conversion apparatus 100 in this first embodiment, the structure of the output bar 140 and the structures of the P-bar 130P and the N-bar 130N are devised so as to reduce the unbalance of the tolerance with respect to the short-circuit current.

Figure 2:
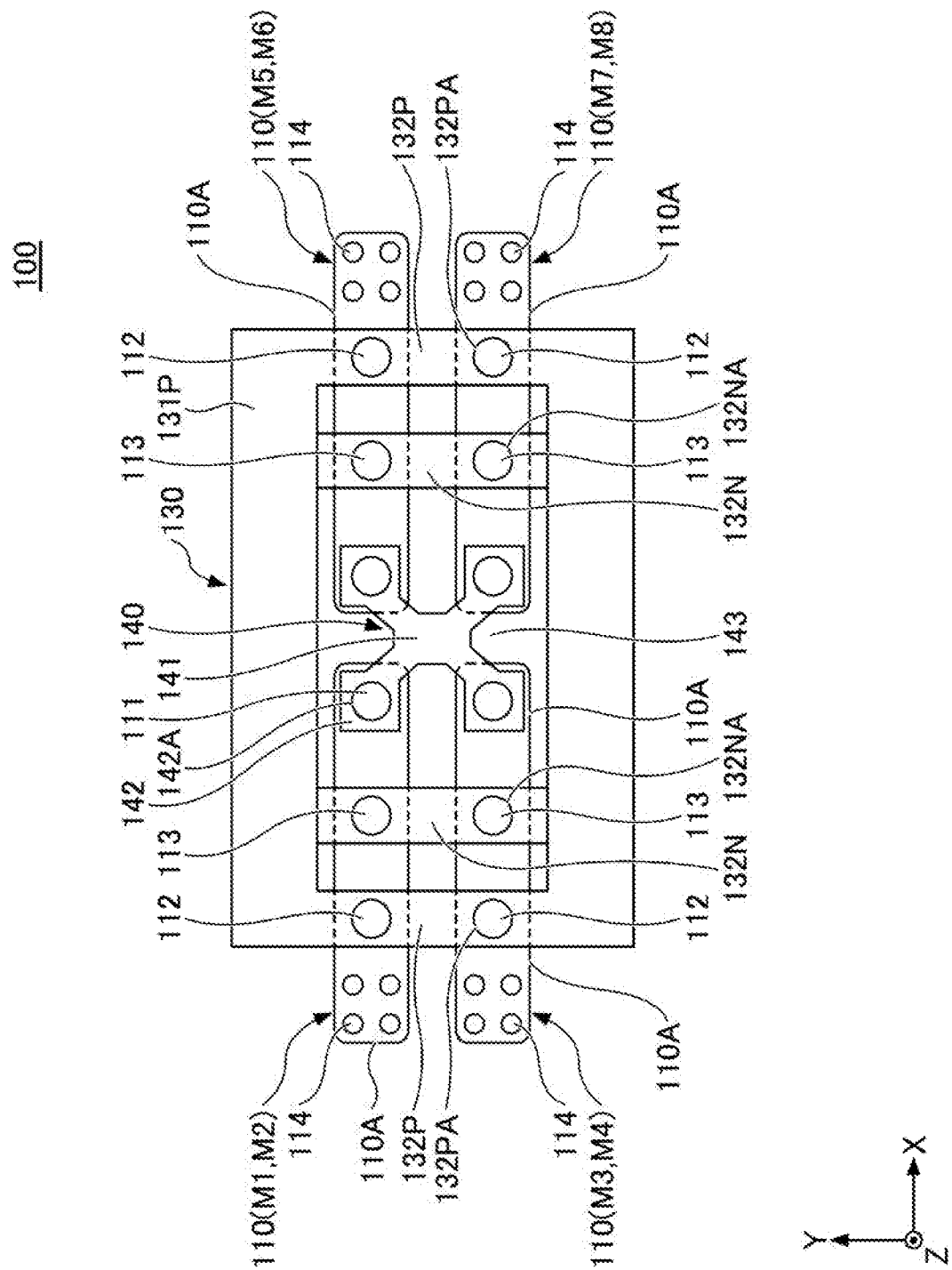
FIG. 2 is a plan view illustrating the example of the power conversion apparatus in the first embodiment.

FIG. 2 is a plan view illustrating the power conversion apparatus 100. FIG. 3A, FIG. 3B, FIG. 3C, and FIG. 3D are plan views illustrating disassembled states of the power conversion apparatus 100. A common XYZ coordinate system is used for the following description. In addition, although a positive Z-axis direction is also referred to as an upward direction and a negative Z-axis direction is also referred to as a downward direction, the upward and downward directions do not necessarily refer to a universal relationship with regard to the upward and downward directions.

The power conversion apparatus 100 includes the 4 semiconductor modules 110, the P-bar 130P, the N-bar 130N, the output bar 140, and insulating paper 150. The illustration of the capacitor 120 illustrated in FIG. 1 is omitted in FIG. 2. In addition, the insulating paper 150 is sandwiched between the P-bar 130P and the N-bar 130N, and is not visible in FIG. 2. Further, the illustration of the semiconductor modules 110 is omitted in FIG. 3A through FIG. 3D.

The semiconductor module 110 is a device having a rectangular parallelepiped shape with a longitudinal direction extending in a X-axis direction in a plan view, and a lateral direction extending in a Y-axis direction in the plan view. For example, rows of the 4 semiconductor modules 110 extend in the X-axis direction, and columns of the 4 semiconductor modules 110 extend in the Y-axis direction, such that the semiconductor modules 110 are arranged in an array of 2 rows by 2 columns. Because the 4 semiconductor modules 110 respectively include the pair of semiconductor switches M1 and M2, the pair of semiconductor switches M3 and M4, the pair of semiconductor switches M5 and M6, and the pair of semiconductor switches M7 and M8, the reference numerals of the semiconductor switches are indicated in brackets besides each semiconductor module 110 illustrated in FIG. 2.

The semiconductor module 110 includes a main semiconductor module body 110A, the output terminals 111, P-terminals 112, N-terminals 113, and terminals 114. The P-terminals 112 are examples of a first-potential-side terminal, and the N-terminals 113 are examples of a second-potential-side terminal. A high-potential-side, which will be described later, is an example of the first-potential-side, and a low-potential-side, which will be described later, is an example of the second-potential-side.

The main semiconductor module body 110A is made of an insulator, such as a resin or the like. The output terminals 111, the P-terminals 112, the N-terminals 113, and the terminals 114 are provided on an upper surface of the main semiconductor module body 110A. The 4 output terminals 111 of the 4 semiconductor modules 110 are arranged closer to each other than the 4 P-terminals 112 and the 4 N-terminals 113.

The output terminal 111 outputs the A.C. power. The 4 output terminals 111 are arranged in an array of 2 rows by 2 columns, similarly to the 4 semiconductor modules 110.

The P-terminals 112 are connected to the drains of the MOSFETs of the semiconductor switches M1, M3, M5, and M7 in the upper arms within the semiconductor modules 110, and connect to the P-bar 130P outside the semiconductor modules 110.

The N-terminals 113 are connected to the sources of the MOSFETs of the semiconductor switches M2, M4, M6, and M8 in the lower arms within the semiconductor modules 110, and connect to the N-bar 130N outside the semiconductor modules 110.

The 4 terminals 114 are respectively connected to the gates and the sources of the MOSFETs of the semiconductor switches M1, M3, M5, and M7 in the upper arms, and to the gates and the sources of the MOSFETs of the semiconductor switches M2, M4, M6, and M8 in the lower arms, within the semiconductor modules 110, and connect to the gate driving circuit that is not illustrated, outside the semiconductor modules 110.

Figure 3A:
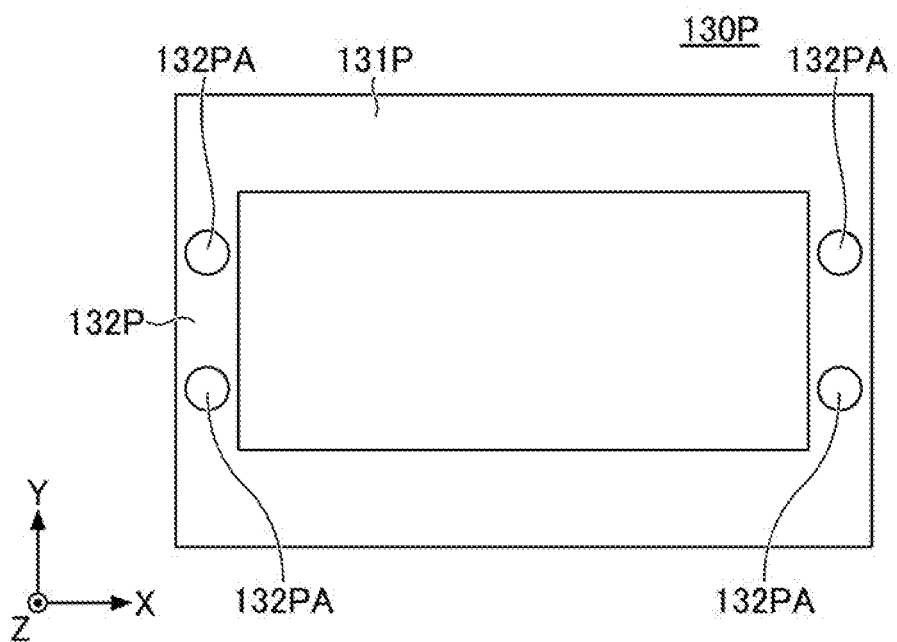
FIG. 3A, FIG. 3B, FIG. 3C, and FIG. 3D are plan views illustrating disassembled states of the example of the power conversion apparatus in the first embodiment.

As illustrated in FIG. 3A, the P-bar 130P has a rectangular frame shape in the plan view, and is formed by pressing a metal plate made of copper, for example. The P-bar 130P is provided as a high-potential-side bus bar. The P-bar 130P is an example of a first-potential-side bar.

The P-bar 130P includes 2 frame parts 131P extending along the X-axis direction, and 2 connecting parts 132P extending along the Y-axis direction and respectively connecting the 2 frame parts 131P.

The frame part 131P is an elongated plate-shaped member with a longitudinal direction extending in the X-axis direction and spreading in a planar manner along an XY-plane. The connecting part 132P is an elongated plate-shaped member with a longitudinal direction extending in the Y-axis direction and spreading in a planar manner along the XY-plane.

In addition, the connecting part 132P includes holes 132PA into which the P-terminals 112 of the 4 semiconductor modules 110 are inserted. 2 holes 132PA are provided in each of the 2 connecting parts 132P.

The P-bar 130P is arranged above the 4 semiconductor modules 110 that are arranged as illustrated in FIG. 2, in a state in which the N-bar 130N and the insulating paper 150 are arranged, and the holes 132PA are aligned to the P-terminals 112 as illustrated in FIG. 2 from above the N-bar 130N and the insulating paper 150. The P-terminals 112 are bonded by soldering in a state in which the P-terminals 112 are inserted into the holes 132PA. The P-bar 130P and the N-bar 130N are insulated by the insulating paper 150.

Figure 3B:
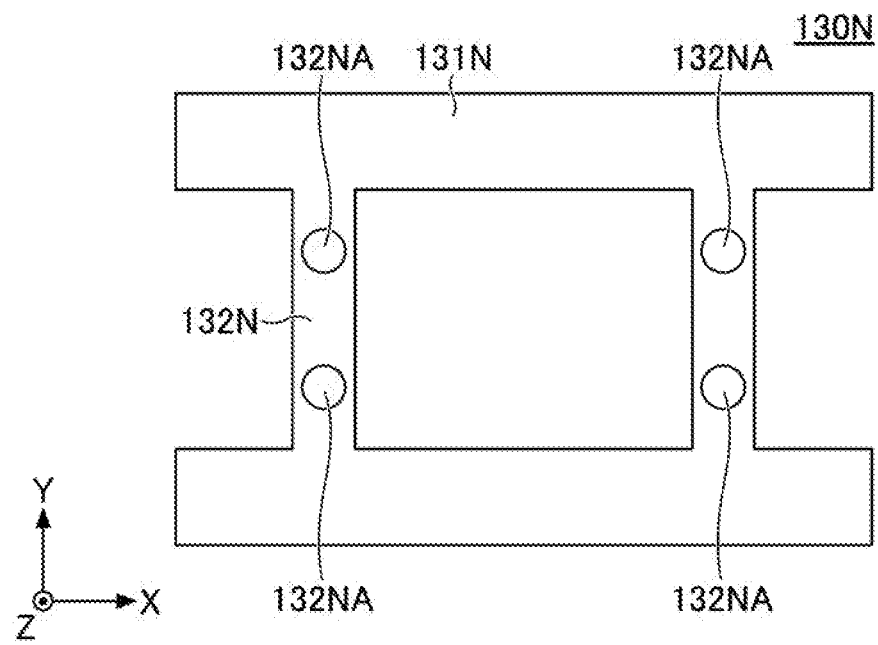

As illustrated in FIG. 3B, the N-bar 130N has a rectangular frame shape in the plan view, and is formed by pressing a metal plate made of copper, for example. The N-bar 130N is provided as a low-potential-side bus bar. The N-bar 130N is an example of a second-potential-side bar.

The N-bar 130N includes 2 frame parts 131N extending along the X-axis direction, and 2 connecting parts 132N extending along the Y-axis direction and respectively connecting the 2 frame parts 131N. The 2 connecting parts 132N are offset from both ends of the 2 frame parts 131N towards the inside along the X-axis direction.

The connecting part 132N includes holes 132NA into which the N-terminals 113 of the 4 semiconductor modules 110 are inserted. 2 holes 132NA are provided in each of the 2 connecting parts 132N. The N-bar 130N is arranged above the 4 semiconductor modules 110 that are arranged as illustrated in FIG. 2, in a state in which the holes 132NA are aligned to the N-terminals 113. The N-terminals 113 are bonded by soldering in a state in which the N-terminals 113 are inserted into the holes 132NA.

The 2 frame parts 131P of the P-bar 130P are arranged to overlap the 2 frame parts 131N, in a state in which 2 sheets of the insulating paper 150 are sandwiched therebetween. The frame parts 131N and the frame parts 131P have the same size in the plan view, and are arranged at mutually aligned positions.

In addition, the insulating paper 150 has a size, in the plan view, that is slightly larger than the size of each of the frame parts 131P and 131N. Hence, the insulating paper 150 is arranged between the frame parts 131P and 131N in a state in which the insulating paper 150 slightly protrudes from the 4 sides of the frame parts 131P and 131N. The insulating paper 150 is arranged in this manner in order to positively insulate the frame parts 131P and 131N.

An electrostatic capacitance is generated between the frame parts 131P and 131N, because the frame parts 131P and 131N overlap via the insulating paper 150. On the other hand, the frame parts 131P and 131N have parasitic inductances. Hence, by optimizing the size of the frame parts 131P and 131N in the plan view and the distance between the frame parts 131P and 131N in the Z-axis direction, it is possible to reduce or cancel the effects of the parasitic inductance when the A.C. power is supplied to the P-bar 130P and the N-bar 130N. The size of the frame parts 131P and 131N in the plan view and the distance between the frame parts 131P and 131N in the Z-axis direction are optimized from this viewpoint.

The P-bar 130P and the N-bar 130N are folded in the Z-axis direction with respect to the frame parts 131P and 131N, so that height positions of the connecting parts 132P and 132N with respect to the semiconductor module 110 are aligned.

Figure 3C:
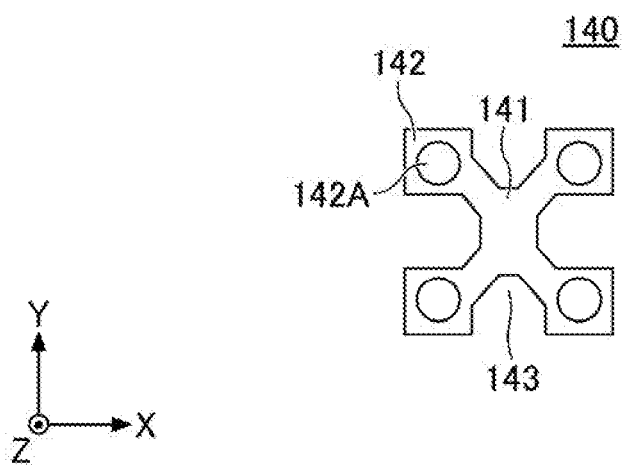

As illustrated in FIG. 3C, the output bar 140 is a metal member that connects the 4 output terminals 111 of the 4 semiconductor modules 110. The output bar 140 is formed by pressing a metal plate made of copper, for example. The output bar 140 is an output bus bar from which the A.C. power from the semiconductor module 110 is obtained.

The output bar 140 includes a center part 141, and extension parts 142. The extension parts 141 as a whole have a shape extending diagonally in 4 directions with respect to the center part 141. A cutout part 143 is provided between 2 adjacent extension parts 142 that are adjacent to each other in the X-axis direction and the Y-axis direction. For this reason, the output bar 140 has a X-shape in the plan view. The X-shape refers to a shape in which intermediate parts at 4 sides of a rectangular shape are cut out inwardly from each side.

The 4 output terminals 111 are arranged at positions corresponding to vertexes of the rectangular shape. In the example illustrated in FIG. 2, the 4 output terminals 111 are arranged at positions corresponding to vertexes of a square shape. The center part 141 is arranged at a position corresponding to a center of the 4 output terminals 111 in the plan view, in accordance with such positions of the output terminals 111.

In addition, the 4 extension parts 142 extend towards the 4 output terminals 111, with respect to the center part 141. A hole 142A is provided in each extension part 142. The output terminal 111 is bonded by soldering in a state in which the output terminal 111 is inserted into the hole 142A.

The output bar 140 includes the extension parts 142 that extend diagonally in 4 directions from the center part 141, and the cutout part 143 between the adjacent extension parts 142 that are adjacent to each other in the X-axis direction and the Y-axis direction, in order to minimize a difference among the distances by which 4 output terminals 111 are connected. Ideally, the distances by which the 4 output terminals 111 are connected are the same, and the shape of the output bar 140 is selected accordingly.

For example, in a case in which no cutout part 143 is provided in the output bar 140, and the output bar 140 has the square shape, a current path of the output bar 140 between the 2 adjacent output terminals 111 that are adjacent to each other in the X-axis direction and the Y-axis direction, greatly differs from a current path of the output bar 140 between 2 mutually adjacent output terminals 111 that are adjacent to each other and are arranged at diagonally opposite ends from the 2 adjacent output terminals 111 that are adjacent to each other in the X-axis direction and the Y-axis direction. However, by providing the cutout parts 143, it is possible to minimize the difference between the current path of the output bar 140 between the 2 adjacent output terminals 111 that are adjacent to each other in the X-axis direction and the Y-axis direction, and the current path of the output bar 140 between 2 mutually adjacent output terminals 111 that are adjacent to each other and are arranged at diagonally opposite ends from the 2 adjacent output terminals 111 that are adjacent to each other in the X-axis direction and the Y-axis direction. In this case, the 2 current paths can be made approximately the same, or ideally, the 2 current paths can be made identical to each other.

Figure 3D:
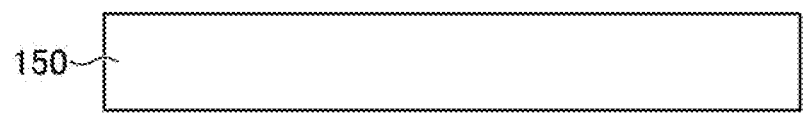
Figure 3D:
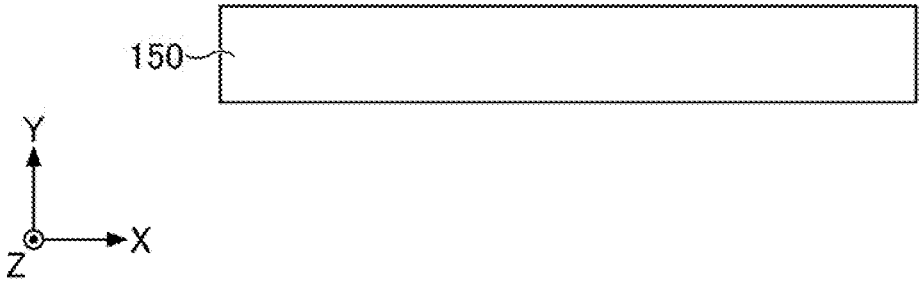

As illustrated in FIG. 3D, 2 sheets of the insulating paper 150 are provided in order to insulate the 2 frame parts 131P with respect to the corresponding 2 frame parts 131N. Commercially available insulating paper may be used for the insulating paper 150. The insulating paper 150 is an example of an insulating part.

Accordingly, in the power conversion apparatus 100, the 3 semiconductor modules 110 are arranged so that the 4 output terminals 111 are closer to each other than the 4 P-terminals 112 and the 4 N-terminals 113, and the 4 output terminals 111 are connected by the output bar 140 having the X-shape. When compared to the 4 output terminals 111 that are arranged closer to each other, the 4 P-terminals 112 are farther away from each other, and the 4 N-terminals 113 are also farther away from each other.

In other words, the current path of the output bar 140 between 2 of the 4 output terminals 111 and the current path of the output bar 140 between the remaining 2 of the 4 output terminals 111 have approximately the same length. Hence, the resistances and the parasitic inductances of the current paths of the output bar 140 connecting the 4 output terminals 111 can be balanced to become approximately the same.

For this reason, when a short-circuit occurs due to a failure or the like in the MOSFET of the semiconductor switch M1 in the upper arm, for example, the short-circuit currents flowing to the MOSFETs of the semiconductor switches M2, M4, M6, and M8 in the lower arm can be balanced, to facilitate designing of the tolerance with respect to the short-circuit current. The short-circuit currents flowing to the corresponding MOSFETs can similarly be balanced to facilitate the designing of the tolerance with respect to the short-circuit current, when the short-circuit occurs due to a failure or the like in the MOSFETs of the semiconductor switches M3, M5, and M7 in the upper arm, and also when the short-circuit occurs due to a failure or the like in the MOSFETs of the semiconductor switches M2, M4, M6, and M8 in the lower arm.

Therefore, according to this embodiment, it is possible to provide the power conversion apparatus 100 which can easily secure tolerance with respect to the short-circuit current. Enabling to easily secure the tolerance with respect to the short-circuit current may mean that, because the difference between the current paths of the output bar 140 connecting the plurality of output terminals 111 is small, the difference among the currents flowing in the plurality of semiconductor modules 110 when a failure or the like occurs is small, thereby making it possible to utilize the plurality of semiconductor modules 110 having the same tolerance with respect to the short-circuit current, for example. Alternatively, enabling to easily secure the tolerance with respect to the short-circuit current may mean that, even if the tolerances with respect to all of the short-circuit currents in the plurality of semiconductor modules 110 are not the same, a small number of kinds of semiconductor modules 110 can be utilized. If the difference between the current paths is large, current values of the short-circuit currents greatly differ, and it is difficult to utilize a plurality of semiconductor modules 110 having the same tolerance with respect to the short-circuit current, because the number of kinds of semiconductor modules 110 to be utilized may increase.

In addition, by optimizing the size of the frame parts 131P and 131N in the plan view and the distance between the frame parts 131P and 131N in the Z-axis direction, it is possible to reduce or cancel the effects of the parasitic inductance when the A.C. power is supplied to the P-bar 130P and the N-bar 130N.

In the example described above, the power conversion apparatus 100 is an inverter, as illustrated in FIG. 1 and FIG. 2. However, the power conversion apparatus 100 is not limited to the inverter. For example, the power conversion apparatus 100 may be a converter that obtains an A.C. output from an intermediate part between a high-potential-side line corresponding to the frame part 131P and a low-potential-side line corresponding to the frame part 131N.

The output bar 140 in the example described above includes the center part 141 and the 4 extension parts 142, and the cutout parts 143 are formed to form the X-shape. However, the output bar 140 is not limited to such a structure, as long as it is possible to reduce the difference between the current paths connecting the 4 output terminals 111. For example, the cutout parts 143 may be cut out toward the center of the 4 output terminals 111. The shape of the cutout parts 143 is also not limited to the shape illustrated in FIG. 3C.

In the example described above, the output bar 140 having the X-shape connects the 4 output terminals 111 of the 4 semiconductor modules 110, however, the number of semiconductor modules 110 may be 3 or more. In a case in which 3 semiconductor modules 110 are provided, for example, 1 semiconductor module 110 among the 4 semiconductor modules 110 arranged as illustrated in FIG. 2 may be omitted. In this case, the output bar 140 may have a shape such that 1 extension part 142 among the 4 extension parts 142 is omitted, and the 3 output terminals 111 of the 3 semiconductor modules 110 may be connected by the output bar 140 having the 3 extension parts 142.

In addition, in a case in which 5 semiconductor modules 110 are provided, for example, 1 extension part 142 may be additionally provided on the output bar 140 so as to minimize the difference among the current paths connecting the 5 output terminals 111. In the cases in which the number of semiconductor modules 110 that are provided is 3, 5, more than 5, the difference among the current paths can more easily be reduced by arranging the output terminals 111 of the plurality of semiconductor modules 110 at the vertexes of a polygon according to the number of semiconductor modules 110 that are provided.

The example described above uses the insulating paper 150. However, the P-bar 130P and the N-bar 130N may be insulated from each other using an insulating member other than the insulating paper 150.

Figure 4:
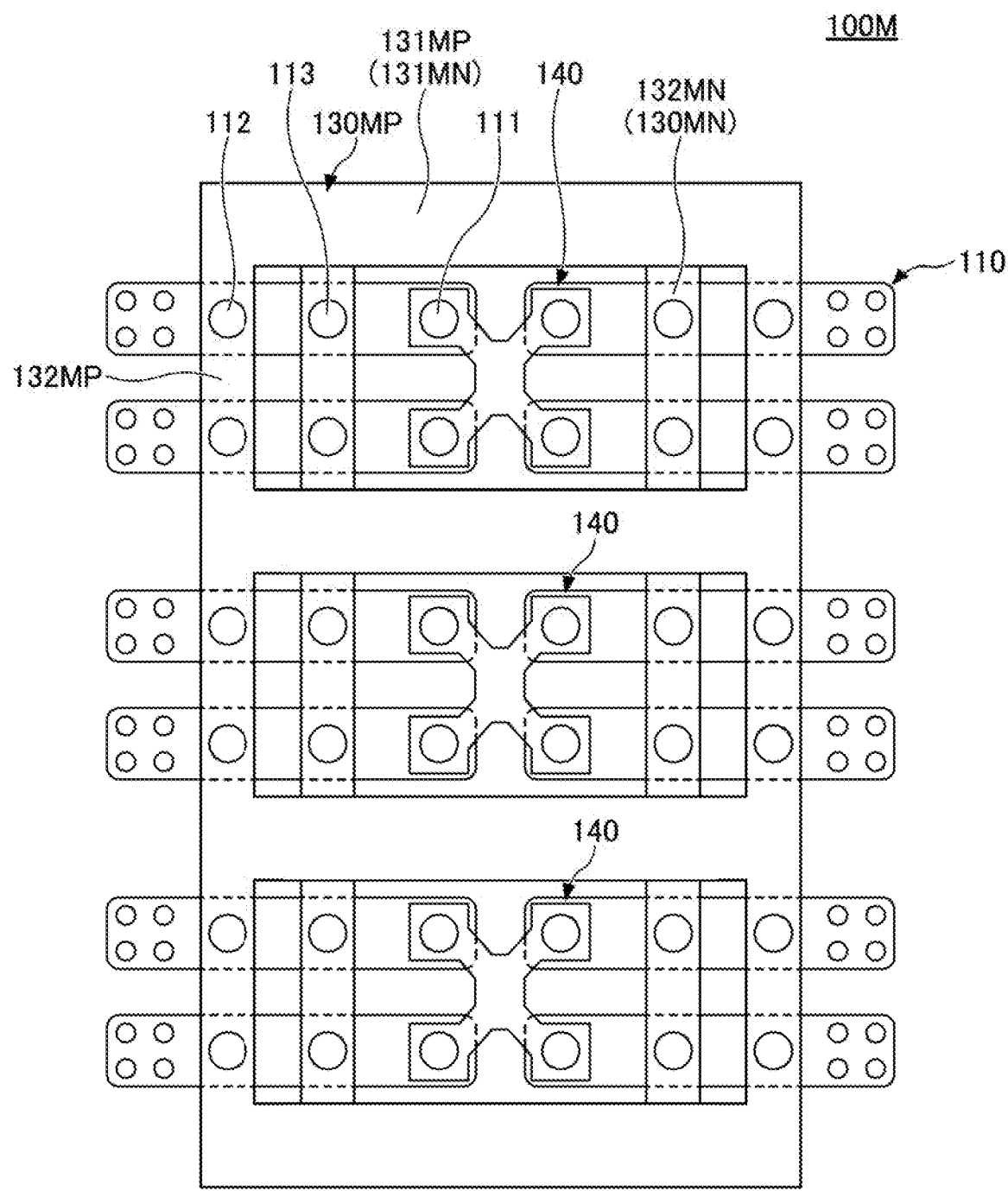
FIG. 4 is a diagram illustrating an example of the power conversion apparatus having a configuration for 3 phases.

In the example described above, the power conversion apparatus 100 outputs the U-phase A.C. power. A configuration for the 3 phases, namely, the U-phase, the V-phase, and the W-phase, is illustrated in FIG. 4. FIG. 4 is a diagram illustrating an example of a power conversion apparatus 100M having a configuration for 3 phases.

The power conversion apparatus 100M includes 12 semiconductor modules 110, a P-bar 130MP, an N-bar 130MN, and 3 output bars 140.

The P-bar 130MP includes 4 frame parts 131MO extending along the X-axis direction, and 2 connecting parts 132MP extending along the Y-axis direction and connecting the 4 frame parts 131MP. The connecting parts 132MP connect the 4 frame parts 131MP from a positive-direction-end along the Y-axis direction to a negative-direction-end along the Y-axis direction.

Similarly, the N-bar 130MN includes 4 frame parts 131MN extending along the X-axis direction, and w connecting parts 132MN extending along the Y-axis direction and connecting the 4 frame parts 131MN. The connecting parts 132MN connect the 4 frame parts 131MN from a positive-direction-end along the Y-axis direction to a negative-direction-end along the Y-axis direction. Because the frame parts 131MN are located under the frame parts 131MP and not visible in the plan view, the reference numeral of the frame part 131MN is indicated in brackets together with the reference numeral of the frame part 131MP for the sake of convenience.

The 12 semiconductor modules 110 are grouped into 3 groups each made up of 4 semiconductor modules 110. Similarly to the output bar 140 illustrated in FIG. 2, each of the 3 output bars 140 connects the output terminals 111 of the 4 semiconductor modules 110, arranged in an array of 2 rows by 2 columns within each group.

For this reason, the current paths of the output bar 140 connecting the 4 output terminals 111 within each group are approximately the same, and the resistances and the parasitic inductances of the current paths of the output bar 140 connecting the 4 output terminals can be approximately balanced. As a result, it is possible to provide the power conversion apparatus 100M which can easily secure tolerance with respect to the short-circuit current.

Further, by optimizing the size of the frame parts 131MP and 131MN in the plan view and the distance between the frame parts 131MP and 131MN in the Z-axis direction, it is possible to reduce or cancel the effects of the parasitic inductance when the A.C. power is supplied to the P-bar 130MP and the N-bar 130MN.

Second Embodiment

Figure 5:
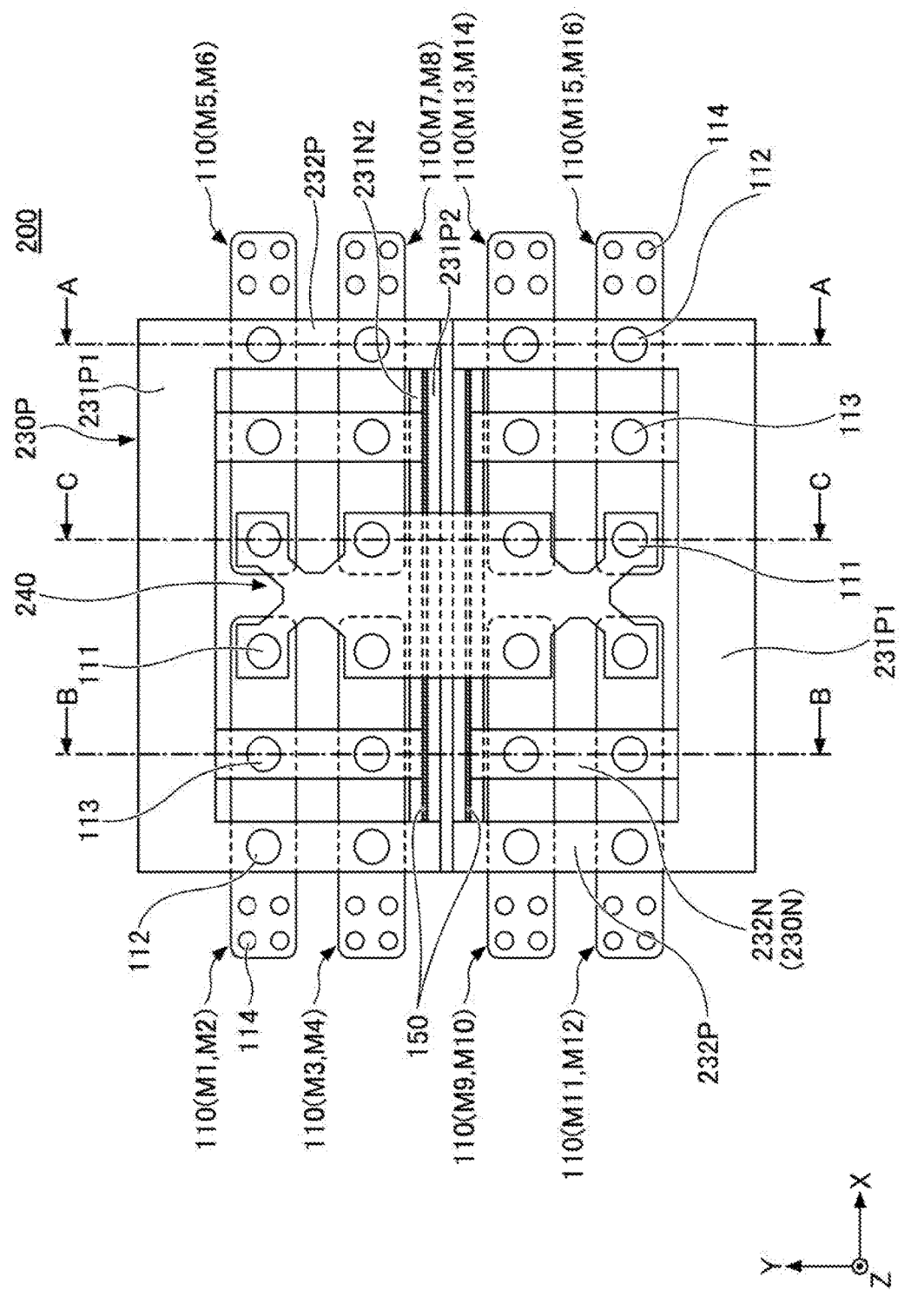
FIG. 5 is a plan view illustrating an example of the power conversion apparatus in a second embodiment.
Figure 6A:
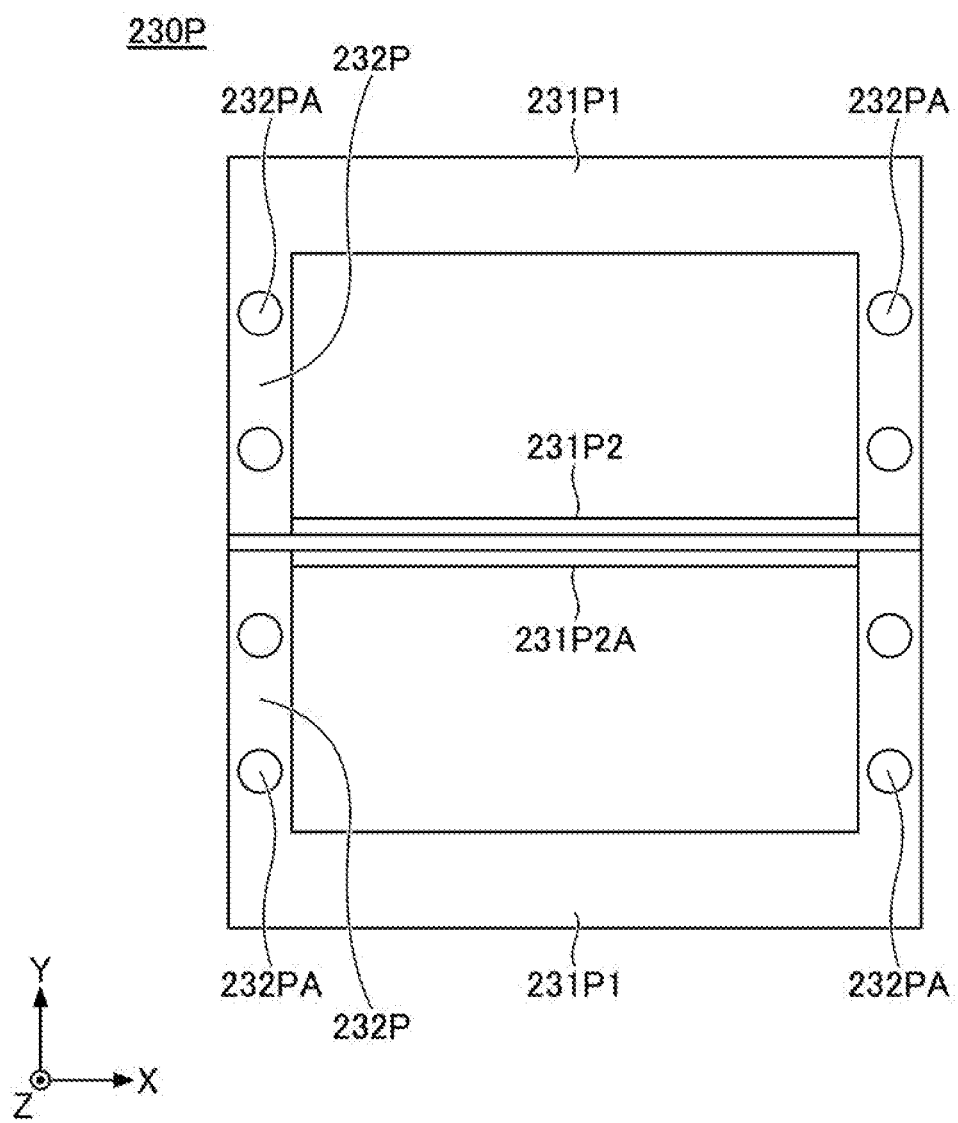
FIG. 6A, FIG. 6B, and FIG. 6C are plan views illustrating disassembled states of the example of the power conversion apparatus in the second embodiment.
Figure 6B:
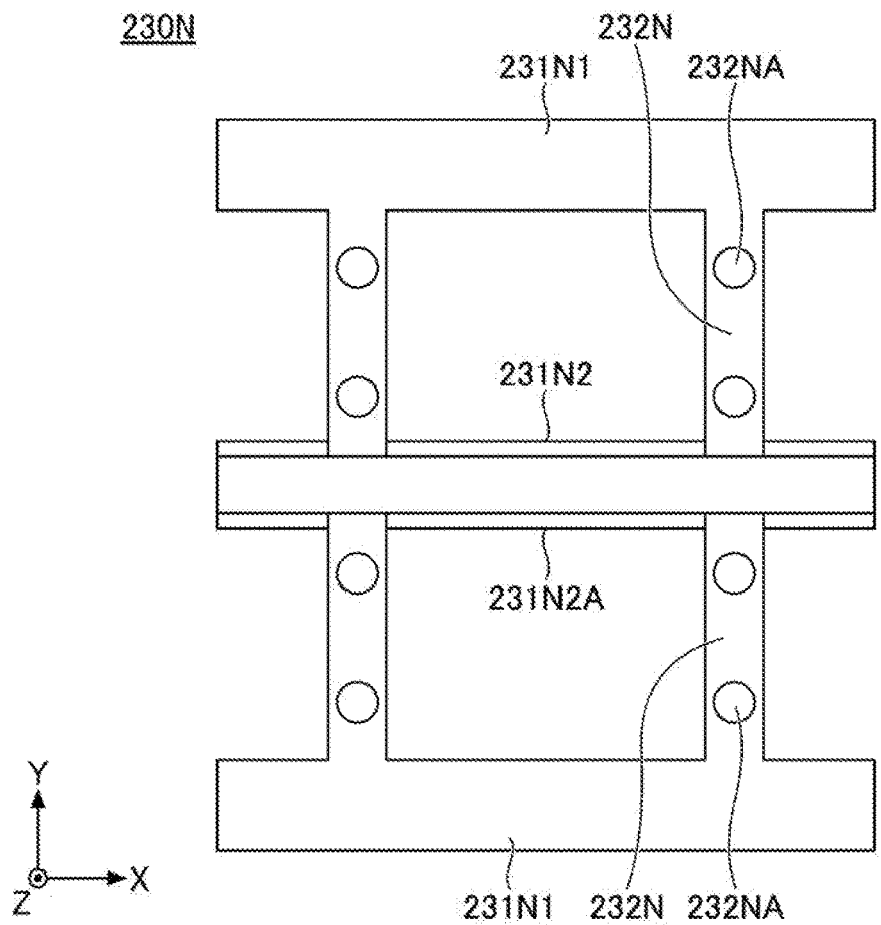
Figure 6C:
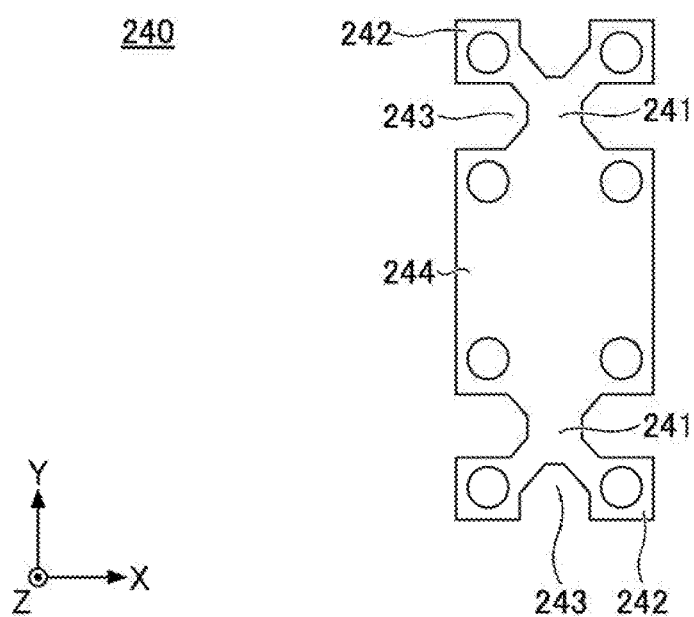
Figure 7A:
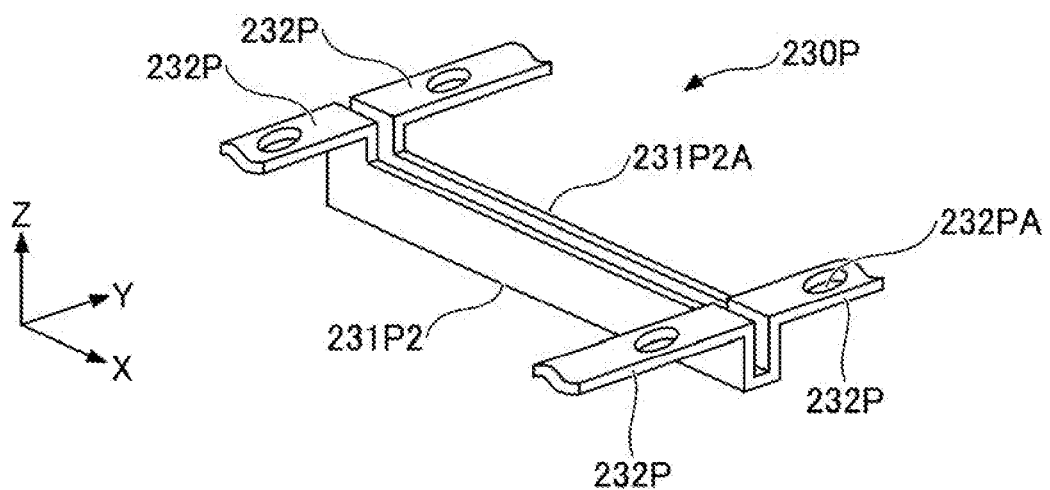
FIG. 7A and FIG. 7B are diagrams, on an enlarged scale, illustrating configurations of parts of the example of the power conversion apparatus in the second embodiment.
Figure 7B:
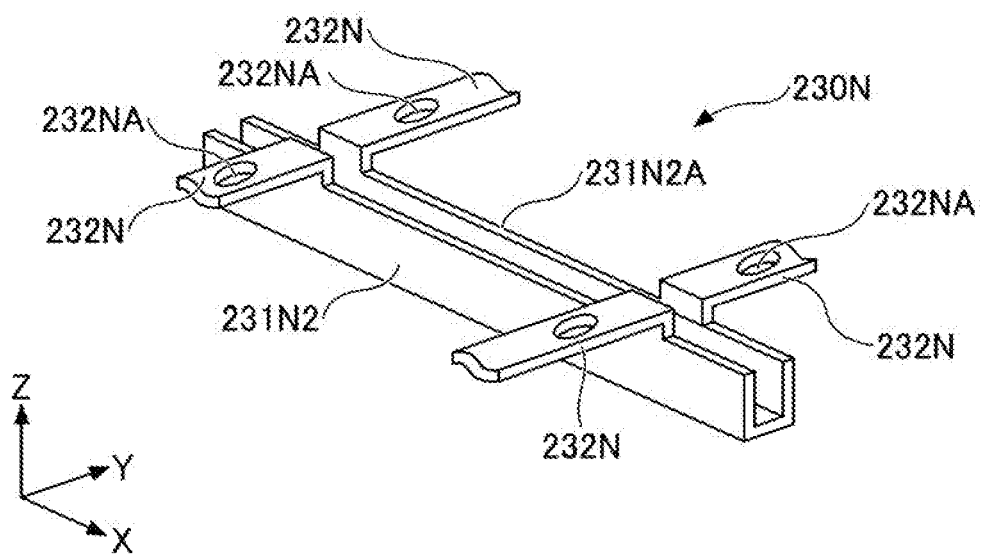
Figure 8A:
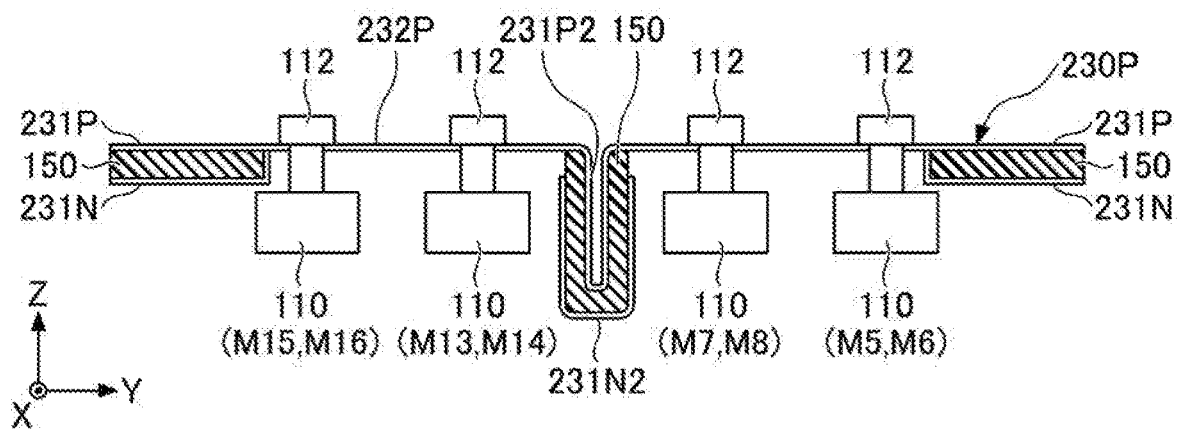
FIG. 8A, FIG. 8B, and FIG. 8C are cross sectional views illustrating the example of the power conversion apparatus in the second embodiment.
Figure 8B:
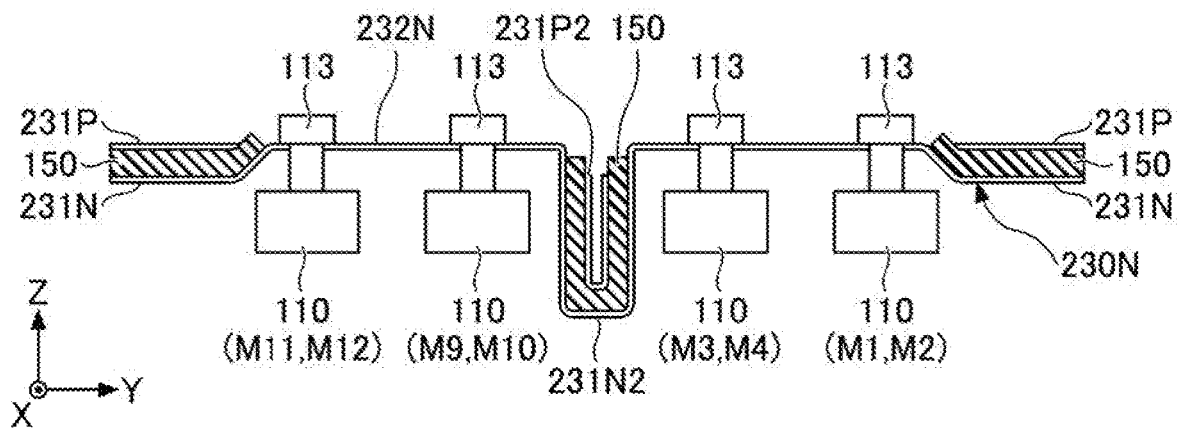
Figure 8C:
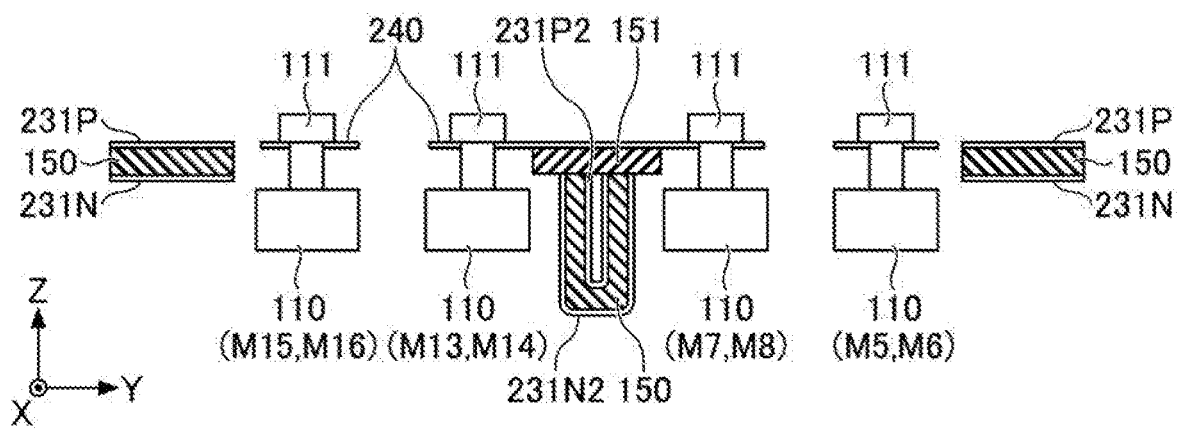

FIG. 5 is a plan view illustrating an example of a power conversion apparatus 200 in a second embodiment. FIG. 6A, FIG. 6B, and FIG. 6C are plan views illustrating disassembled states of the power conversion apparatus 200. FIG. 7A and FIG. 7B are diagrams, on an enlarged scale, illustrating configurations of parts of the power conversion apparatus 200. FIG. 8A, FIG. 8B, and FIG. 8C are cross sectional views illustrating the power conversion apparatus 200. The cross sections illustrated in FIG. 8A, FIG. 8B, and FIG. 8C respectively are cross sections taken along a line A-A in FIG. 5, a line B-B in FIG. 5, and a line C-C in FIG. 5. Each part will basically be described using FIG. 5 and FIG. 6A through FIG. 6C, and FIG. 7A, FIG. 7B, FIG. 8A, FIG. 8B, and FIG. 8C will be used when describing specific parts.

The power conversion apparatus 200 includes 8 semiconductor modules 110, a P-bar 230P, an N-bar 230N, and an output bar 240. Although not illustrated in FIG. 5 and FIG. 6A through FIG. 6C, the power conversion apparatus 200 further includes a capacitor 120 that is connected between the P-bar 230P and the N-bar 230N.

For example, the power conversion apparatus 200 is a two-level inverter that outputs the U-phase among the U-phase, the V-phase, and the W-phase of the three-phase A.C. power. The configuration of the 2 power conversion apparatuses respectively outputting the V-phase and the W-phase may be the same as the configuration of the power conversion apparatus 200 outputting the U-phase.

The configuration of the semiconductor module 110 is the same as that of the first embodiment, but the number of semiconductor modules 110 is increased to 8 from 4 of the first embodiment. The output terminals 111 of the 8 semiconductor modules 110 are connected by the output bar 240. When a circuit similar to that illustrated in FIG. 1 is taken into consideration, the semiconductor module 110 in this embodiment has a configuration including, in addition to the semiconductor switches M1 through M8, semiconductor switches M9, M11, M13, and M15 in the upper arm, and semiconductor switches M10, M12, M14, and M16 in the lower arm.

In order to omit the illustration of a circuit diagram for the second embodiment, FIG. 5 illustrates the reference numerals (M1 through M16) of the semiconductor switches in brackets, namely, the pair of semiconductor switches included in each of the 8 semiconductor modules 110. The 4 semiconductor modules 110 including the semiconductor switches M1 through M8 have the same arrangement as the 4 semiconductor modules 110 illustrated in FIG. 2. In addition, the remaining 4 semiconductor modules 110 including the semiconductor switches M9 through M16 also have the same arrangement as the 4 semiconductor modules 110 illustrated in FIG. 2.

A gap in the Y-axis direction between the 2 semiconductor modules 110 including the semiconductor switches M3, M4, M7, and M8 and the 2 semiconductor modules 110 including the semiconductor switches M9, M10, M13, and M14 is set slightly wider than a gap in the Y-axis direction within the group of the 4 semiconductor modules 110 including the semiconductor switches M1 through M8, and a gap in the Y-axis direction within the group of the 4 semiconductor modules 110 including the semiconductor switches M9 through M16.

The power conversion apparatus 200 includes the 8 semiconductor modules 110, the P-bar 230P, the N-bar 230N, the output bar 240, 3 sheets of insulating paper 150, and 1 sheet of insulating paper 151 illustrated in FIG. 8C. The illustration of the 3 sheets of insulating paper 150 and 1 sheet of insulating paper 151 is omitted in FIG. 5 and FIG. 6A through FIG. 6C, however, the insulating paper 150 is the same as the insulating paper 150 illustrated in FIG. 3D. The insulating paper 151 has a size different from the size of the insulating paper 150, but the insulating paper 151 is similar to the insulating paper 150. The illustration of the semiconductor module 110 is omitted in FIG. 6A through FIG. 6C.

The 8 semiconductor modules 110 are arranged so that the 8 output terminals 111 are closer to each other than the 8 P-terminals 112 and the 8 N-terminals 113.

The output terminal 111 outputs the A.C. power. The 8 output terminals 111 are grouped into 2 groups each made up of 4 output terminals 111, and the output terminals 111 within each group are arranged in an array of 2 rows by 2 columns, similarly to the 8 semiconductor modules 110.

The P-terminals 112 are connected to the drains of the MOSFETs of the semiconductor switches in the upper arms within the semiconductor modules 110, and connect to the P-bar 230P outside the semiconductor modules 110.

The N-terminals 113 are connected to the sources of the MOSFETs of the semiconductor switches in the lower arms within the semiconductor modules 110, and connect to the N-bar 230N outside the semiconductor modules 110.

As illustrated in FIG. 6A, the P-bar 230P has a frame shape that is like a combination of 2 rectangular frames in the plan view, and is formed by pressing a metal plate made of copper, for example. The P-bar 230P includes 2 frame parts 231P1 extending along the X-axis direction at both ends along the Y-axis direction, and 1 frame part 231P2 extending along the X-axis direction at a center along the Y-axis direction. The P-bar 230P further includes 4 connecting parts 232P extending along the Y-axis direction and respectively connecting the 2 frame parts 231P1 and the frame part 231P2.

The frame part 231P1 is an elongated plate-shaped member with a longitudinal direction extending in the X-axis direction and spreading in a planar manner along the XY-plane. The frame part 231P2 is originally an elongated member with a longitudinal direction extending in the X-axis direction and spreading in a planar manner along the XY-plane, and this elongated member is valley-folded in the negative Z-axis direction by regarding a center of the width along the Y-axis direction as a valley along the X-axis direction, to a folded shape of the frame part 231P2 illustrated in FIG. 7A. A size of the frame part 231P2 before being folded is the same as the size of the frame part 231P1.

A positive Y-axis direction-side of the 8 semiconductor modules 110 is an example of a first side, and a negative Y-axis direction-side of the 8 semiconductor modules 110 is an example of a second side. In addition, between the 2 frame parts 231P1, the frame part 231P1 on the positive Y-axis direction-side is an example of a first first-potential-side frame part, and the frame part 231P1 on the negative Y-axis direction-side is an example of a second first-potential-side frame part. The frame part 231P2 is an example of a first-potential-side intermediate frame part, and also an example of a folded-in part located in a gap between adjacent semiconductor modules 110, at a part of a boundary between the 8 semiconductor modules 110. Further, the connecting part 232P is an example of a first-potential-side connecting part.

In order to prevent contact of the connection part 232P of the P-bar 230P and a connecting part 232N of the N-bar 230N, which will be described later, along the height direction (that is, the Z-axis direction), the frame part 231P2 includes a cavity part 231P2A. An upper part of the frame part 231P2 along the Z-axis direction in a section between the 2 connecting parts 232P on both ends along the Y-axis direction, is cut along the negative X-axis direction to form the cavity part 231P2A. The cavity part 231P2A is formed by cutting after folding the frame part 231P1 prior to the cutting.

In addition, the connecting part 232P includes holes 232PA into which the P-terminals 112 of the 8 semiconductor modules 110 are inserted. 2 holes 232PA are provided in each of the 4 connecting parts 232P.

The P-bar 230P is arranged above the 8 semiconductor modules 110 that are arranged as illustrated in FIG. 5, in a state in which the N-bar 230N and the insulating paper 150 are arranged, and the holes 232PA are aligned to the P-terminals 112 as illustrated in FIG. 5 from above the N-bar 230N and the insulating paper 150. The P-terminals 112 are bonded by soldering in a state in which the P-terminals 112 are inserted into the holes 232PA. The P-bar 230P and the N-bar 230N are insulated by the insulating paper 150.

As illustrated in FIG. 6B, the N-bar 230N has a frame shape that is like a combination of 2 rectangular frames in the plan view, and is formed by pressing a metal plate made of copper, for example. The N-bar 230N includes 2 frame parts 231N1 extending along the X-axis direction at both ends along the Y-axis direction, and 1 frame part 231N2 extending along the X-axis direction at a center along the Y-axis direction. The N-bar 230N further includes 4 connecting parts 232N extending along the Y-axis direction and respectively connecting the 2 frame parts 231N1 and the frame part 231N2. The 4 connecting parts 232N are offset from both ends of the frame parts 231N1 and 231N2 towards the inside along the X-axis direction.

Between the 2 frame parts 231N1, the frame part 231N1 on the positive Y-axis direction-side is an example of a first second-potential-side frame part, and the frame part 231N1 on the negative Y-axis direction-side is an example of a second second-potential-side frame part. The frame part 231N2 is an example of a second-potential-side intermediate frame part, and also an example of a folded-in part located in a gap between adjacent semiconductor modules 110, at a part of a boundary between the 8 semiconductor modules 110. Further, the connecting part 232N is an example of a second-potential-side connecting part.

The frame part 231N1 is an elongated plate-shaped member with a longitudinal direction extending in the X-axis direction and spreading in a planar manner along the XY-plane. The frame part 231N2 is originally an elongated member with a longitudinal direction extending in the X-axis direction and spreading in a planar manner along the XY-plane, and this elongated member is valley-folded in the negative Z-axis direction by regarding a center of the width along the Y-axis direction as a valley along the X-axis direction, to a folded shape of the frame part 231N2 illustrated in FIG. 7B. A size of the frame part 231N2 before being folded is the same as the size of the frame part 231N1.

In order to prevent contact of the connection part 232P of the P-bar 230P and the connecting part 232N of the N-bar 230N along the height direction (that is, the Z-axis direction), the frame part 231N2 includes a cavity part 231PNA. An upper part of the frame part 231N2 along the Z-axis direction in a section between the 2 connecting parts 232N on both ends along the Y-axis direction, and sections on an outer side of the 2 connecting parts 232N along the X-axis direction, are cut along the negative X-axis direction to form the cavity part 231N2A. The cavity part 231N2A is formed by cutting after folding the frame part 231N1 prior to the cutting.

In addition, the connecting part 232N includes holes 232NA into which the N-terminals 113 of the 8 semiconductor modules 110 are inserted. 2 holes 232NA are provided in each of the 4 connecting parts 232N.

The N-bar 230N is arranged above the 8 semiconductor modules 110 that are arranged as illustrated in FIG. 5, in a state in which the holes 232NA are aligned to the N-terminals 113 as illustrated in FIG. 5. The N-terminals 113 are bonded by soldering in a state in which the N-terminals 113 are inserted into the holes 232NA. The P-bar 230P and the N-bar 230N are insulated by the insulating paper 150.

For this reason, a cross section along a line A-A in FIG. 5 and a cross section along a line B-B in FIG. 5 become as illustrated in FIG. 8A and FIG. 8B, respectively.

The gap in the Y-axis direction between the 2 semiconductor modules 110 including the semiconductor switches M3, M4, M7, and M8 and the 2 semiconductor modules 110 including the semiconductor switches M9, M10, M13, and M14 is set slightly wider than the gap in the Y-axis direction within the group of the 4 semiconductor modules 110 including the semiconductor switches M1 through M8, and the gap in the Y-axis direction within the group of the 4 semiconductor modules 110 including the semiconductor switches M9 through M16. The gaps in the Y-axis direction between the 2 semiconductor modules 110 and the corresponding 2 semiconductor modules described above are set slightly wider, so that the frame parts 231P2 and 231N2 can be provided in the respective gaps, to reduce or cancel the effects of the parasitic inductance of the P-bar 230P and the N-bar 230N between the 4 semiconductor modules 110 including the semiconductor switches M1 through M8 and the 4 semiconductor modules 110 including the semiconductor switches M9 through M16.

The insulating paper 150 is provided between the 2 frame parts 231P1 and the 2 frame parts 231N1, and between the 1 frame part 231P2 and the 1 frame part 231N2. The frame part 231P1 is arranged to overlap the frame part 231N1 in a state in which the insulating paper 150 is sandwiched therebetween. The frame parts 231N1 and the frame parts 231P1 have the same size in the plan view, and are arranged at mutually aligned positions.

In addition, the insulating paper 150 has a size, in the plan view, that is slightly larger than the size of each of the frame parts 231P1 and 231N1. Hence, the insulating paper 150 is arranged between the frame parts 231P1 and 231N1 in a state in which the insulating paper 150 slightly protrudes from the 4 sides of the frame parts 231P1 and 231N1. The insulating paper 150 is arranged in this manner in order to positively insulate the frame parts 231P1 and 231N1.

The frame part 231P2 having a U-shape in a cross section parallel to the XY-plane is inserted into and accommodated within the frame part 231N2 similarly having a U-shape in the cross section parallel to the XY-plane. Hence, 1 sheet of insulating paper 150 is inserted between the frame part 231P1 and the frame part 231N1, in a folded state. The insulating paper 150 is also arranged between the frame part 231P2 and the frame part 231N2 so as to slight protrude from the sides of the frame parts 231P2 and 231N2, in order to provide a positive insulation.

An electrostatic capacitance is generated between the frame parts 231P1 and 231N1, because the frame parts 231P1 and 231N1 overlap via the insulating paper 150. In addition, an electrostatic capacitance is generated between the frame parts 231P2 and 231N2, because the frame parts 231P2 and 231N2 overlap via the insulating paper 150. On the other hand, the frame parts 231P1, 231P2, 231N1, and 231N2 have parasitic inductances. Hence, by optimizing the size of the frame parts 231P1 and 231N1 in the plan view and the distance between the frame parts 231P1 and 231N1 in the Z-axis direction, and optimizing the size of opposing parts of the frame parts 231P2 and 231N2 in the folded state and a gap between the opposing parts of the frame parts 231P2 and 231N2 in the folded state, it is possible to reduce or cancel the effects of the parasitic inductance when the A.C. power is supplied to the P-bar 230P and the N-bar 230N. The size of the frame parts 231P1 and 231N1 in the plan view and the distance between the frame parts 231P1 and 231N1 in the Z-axis direction, and the size of the opposing parts of the frame parts 231P2 and 231N2 in the folded state and the gap between the opposing parts of the frame parts 231P2 and 231N2 in the folded state, are optimized from this viewpoint.

The P-bar 230P and the N-bar 230N are folded in the Z-axis direction with respect to the frame parts 231P1 and 231N1, so that height positions of the connecting parts 232P and 232N with respect to the semiconductor module 110 are aligned.

As illustrated in FIG. 6C, the output bar 240 is a metal member that connects the 8 output terminals 111 of the 8 semiconductor modules 110. The output bar 240 is formed by pressing a metal plate made of copper, for example. The output bar 240 includes 2 center parts 241, 8 extension parts 242, and a connecting part 244. The extension parts 242 have a shape extending diagonally in 4 directions with respect to each center part 241. The extension parts 242 include holes 242A, and the output terminal 111 is connected to each hole 242A. A cutout part 243 is provided between 2 adjacent extension parts 242 that are adjacent to each other in the X-axis direction and the Y-axis direction. In addition, the connecting part 244 is a rectangular part that connects parts corresponding to 2 X-shaped output bars 140 illustrated in FIG. 3C.

For this reason, the output bar 240 has a shape in which, in the plan view, the rectangular connecting part 244 connects parts corresponding to 2 X-shaped output bars 140 illustrated in FIG. 3C. A positional relationship of the center parts 241 and the extension parts 242 is similar to the positional relationship of the center part 141 and the extension parts 142 of the output bar 140 illustrated in FIG. 3C.

The output bar 240 includes 6 cutout parts 243 in order to minimize a difference among the distances by which the 8 output terminals 111 of the 8 semiconductor modules 110 are connected.

For example, if no cutout part 243 were provided between the adjacent output terminals 111 of the output bar 240, the current path on the output bar 240 would become short. However, by providing the cutout part 243 between the adjacent output terminals 111, it becomes possible to minimize a difference among the lengths of the current paths on the output bar 240 connecting the 8 output terminals 111 of the 8 semiconductor modules 110.

The connecting part 244 is provided above upper ends of the frame part 231P2 of the P-bar 230P and the frame part 231N2 of the N-bar 240N. Hence, as illustrated in FIG. 8C, the insulating paper 151 is provided between the connecting part 244 and the upper ends of the frame parts 231P2 and 231N2. The insulating paper 151 has a size, in the plan view, sufficient to insulate the connecting part 244 with respect to the frame parts 231P2 and 231N2.

Accordingly, in the power conversion apparatus 200, the 8 semiconductor modules 110 are arranged so that the 8 output terminals 111 are closer to each other than the 8 P-terminals 112 and the 8 N-terminals 113, and the 8 output terminals 111 are connected by the output bar 240. When compared to the 8 output terminals 111 that are arranged closer to each other, the 8 P-terminals 112 are farther away from each other, and the 8 N-terminals 113 are also farther away from each other.

In other words, it becomes possible to minimize a difference among the lengths of the current paths on the output bar 240 connecting the 8 output terminals 111 of the 8 semiconductor modules 110.

For this reason, when a short-circuit occurs due to a failure or the like in the MOSFET of the semiconductor switch M1 in the upper arm, for example, the short-circuit currents flowing to the MOSFETs of the semiconductor switches M2, M4, M6, M8, M10, M12, M14, and M16 in the lower arm can be balanced, to facilitate designing of the tolerance with respect to the short-circuit current. The short-circuit currents flowing to the corresponding MOSFETs can similarly be balanced to facilitate the designing of the tolerance with respect to the short-circuit current, when the short-circuit occurs due to a failure or the like in the MOSFETs of the semiconductor switches M3, M5, M7, M9, M11, M13, and M15 in the upper arm, and also when the short-circuit occurs due to a failure or the like in the MOSFETs of the semiconductor switches M2, M4, M6, M8, M10, M12, M14, and M16 in the lower arm.

In the power conversion apparatus 200, in addition to including the output bar 240 described above, the P-bar 230P and the N-bar 230N that are used respectively have the frame parts 231P2 and 231N2 folded at an intermediate part along the Y-axis direction. Hence, it is possible to shorten the distance in the Y-axis direction between the 2 semiconductor modules 110 including the semiconductor switches M3, M4, M7, and M8 and the 2 semiconductor modules 110 including the semiconductor switches M9, M10, M13, and M14.

Hence, the distance in the Y-axis direction is shortened, while securing the size of the frame parts 231P2 and 231N2 (that is, an area of the folded-in part) to a certain extent. In other words, the distance in the Y-axis direction can be shortened, while securing the size of the frame parts 231P2 and 231N2 that is the same as the size of the frame parts 231P1 and 231N1.

For this reason, it is possible simultaneously. reduce or cancel the effects of the parasitic inductance when the A.C. power is supplied to the P-bar 230P and the N-bar 230N, and shorten the current path between the group of semiconductor switches M1 through M8 and the group of semiconductor switches M9 through M16 by reducing the length of the connecting part 244 of the output bar 240 along the Y-axis direction.

Therefore, according to this embodiment, it is possible to provide the power conversion apparatus 100 which can easily secure tolerance with respect to the short-circuit current.

In addition, by optimizing the size of the frame parts 231P1, 231P2, 231N1, and 231N2 in the plan view and the distance between the frame parts 231P1 and 231P2 and the frame parts 231N1 and 231N2 in the Z-axis direction, it is possible to reduce or cancel the effects of the parasitic inductance when the A.C. power is supplied to the P-bar 230P and the N-bar 230N.

In the example described above, the power conversion apparatus 200 uses the output bar 240 that connects the 8 output terminals 111. However, instead of using the output bar 240, 2 output bars 140 of the first embodiment may be used, to separately connect the 4 output terminals 111 of the 4 semiconductor modules 110 including the semiconductor switches M1 through M8 using one of the 2 output bars 140, and the 4 output terminals 111 of the 4 semiconductor modules 110 including the semiconductor switches M9 through M16 using the other of the 2 output bars 140.

Figure 9:
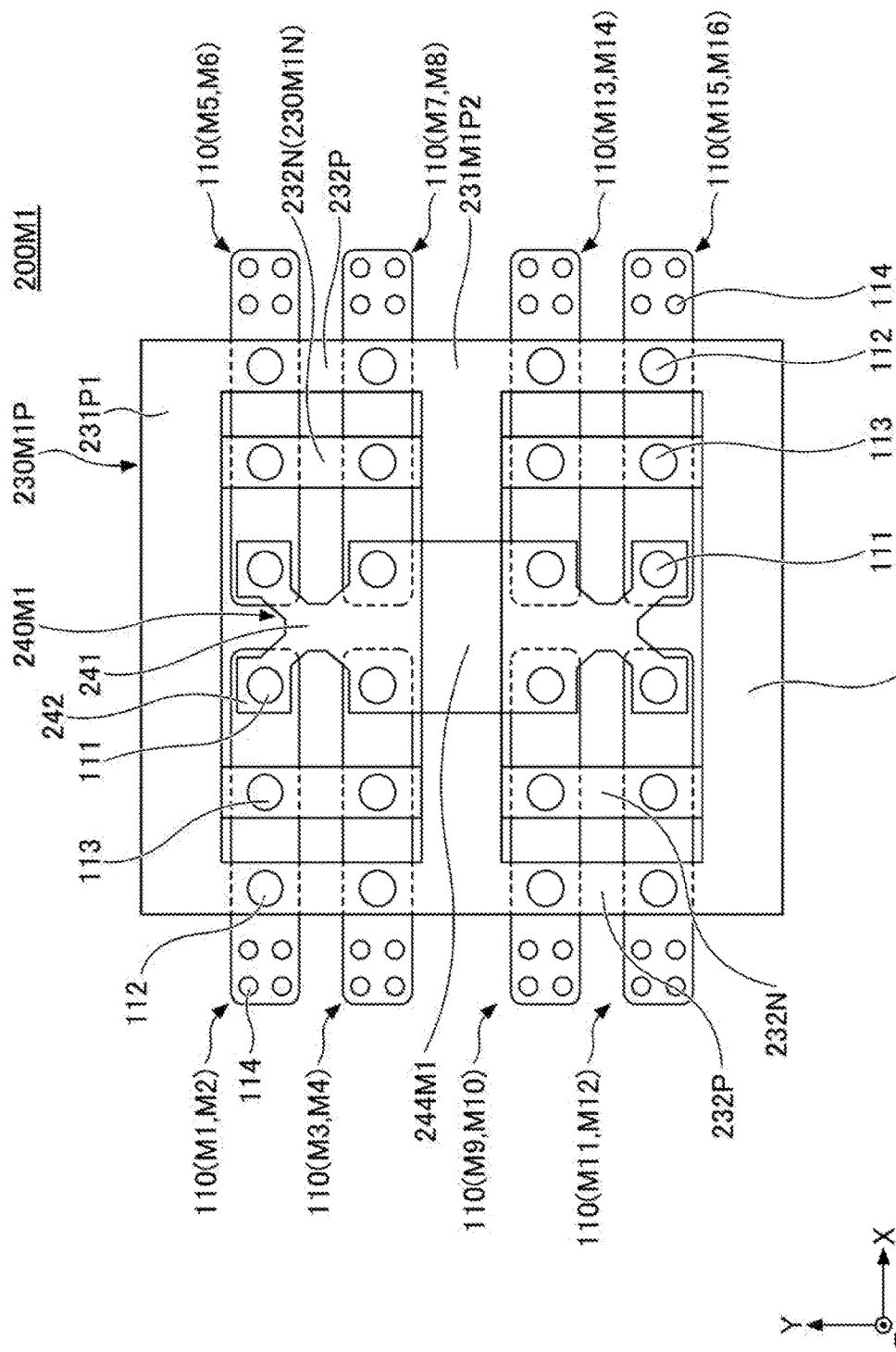
FIG. 9 is a plan view illustrating an example of the power conversion apparatus in a first modification of the second embodiment.

In the example described above, the P-bar 230P and the N-bar 230N respectively have the frame parts 231P2 and 231N2 that are folded. However, the frame parts 231P2 and 231N2 may be used in a flat state without being folded. FIG. 9 is a plan view illustrating a power conversion apparatus 200M1 in a first modification of the second embodiment. In FIG. 9, those parts that are the same as those corresponding parts in FIG. 5 through FIG. 8C are designated by the same reference numerals, and a description thereof will be omitted.

The power conversion apparatus 200M1 includes 8 semiconductor modules 110, a P-bar 230M1P, an N-bar 230M1N, and an output bar 240M1.

The P-bar 230M1P includes a frame part 231P1, a frame part 231M1P2, and a connecting part 232P. The frame part 231M1P2 of the P-bar 230M1P differs from the frame part 231P2 illustrated in FIG. 5 through FIG. 8C in that the frame part 231M1P2 is used in the flat state without being folded.

The frame part 231M1P2 is an example of the first-potential-side intermediate frame part.

The N-bar 230M1N includes a frame part 231N1, a frame part 231M1N2, and a connecting part 232N. The frame part 231M1N2 of the N-bar 230M1N differs from the frame part 231N2 illustrated in FIG. 5 through FIG. 8C in that the frame part 231M1N2 is used in the flat state without being folded. Because the frame parts 231N1 and the frame part 231M1N2 respectively are located immediately under the frame part 231P1 and the frame part 231M1P2 and not visible in FIG. 9, the reference numerals of the frame part 231N1 and the frame part 231M1N2 are indicated in brackets together with the reference numerals of the frame part 231P1 and the frame part 231M1P2 for the sake of convenience. The frame part 231M1N2 is an example of the second-potential-side intermediate frame part.

The output bar 240M1 includes center parts 241, extension parts 242, cutout parts 243, and a connecting part 244M1. Because the frame part 231M1P2 of the P-bar 230M1P and the frame part 231M1N2 of the N-bar 230M1N of the output bar 240M1 are flat and not folded, the connecting part 244M1 differs from the connecting part 244 illustrated in FIG. 5 through 8C in that the connecting part 244M1 is longer along the Y-axis direction.

It is possible to employ the configuration of the power conversion apparatus 100M1 in a case in which securing the tolerance with respect to the short-circuit current is unaffected even if the length of the connecting part 244M1 in the Y-axis direction becomes longer than that of the connecting part 244.

Figure 10:
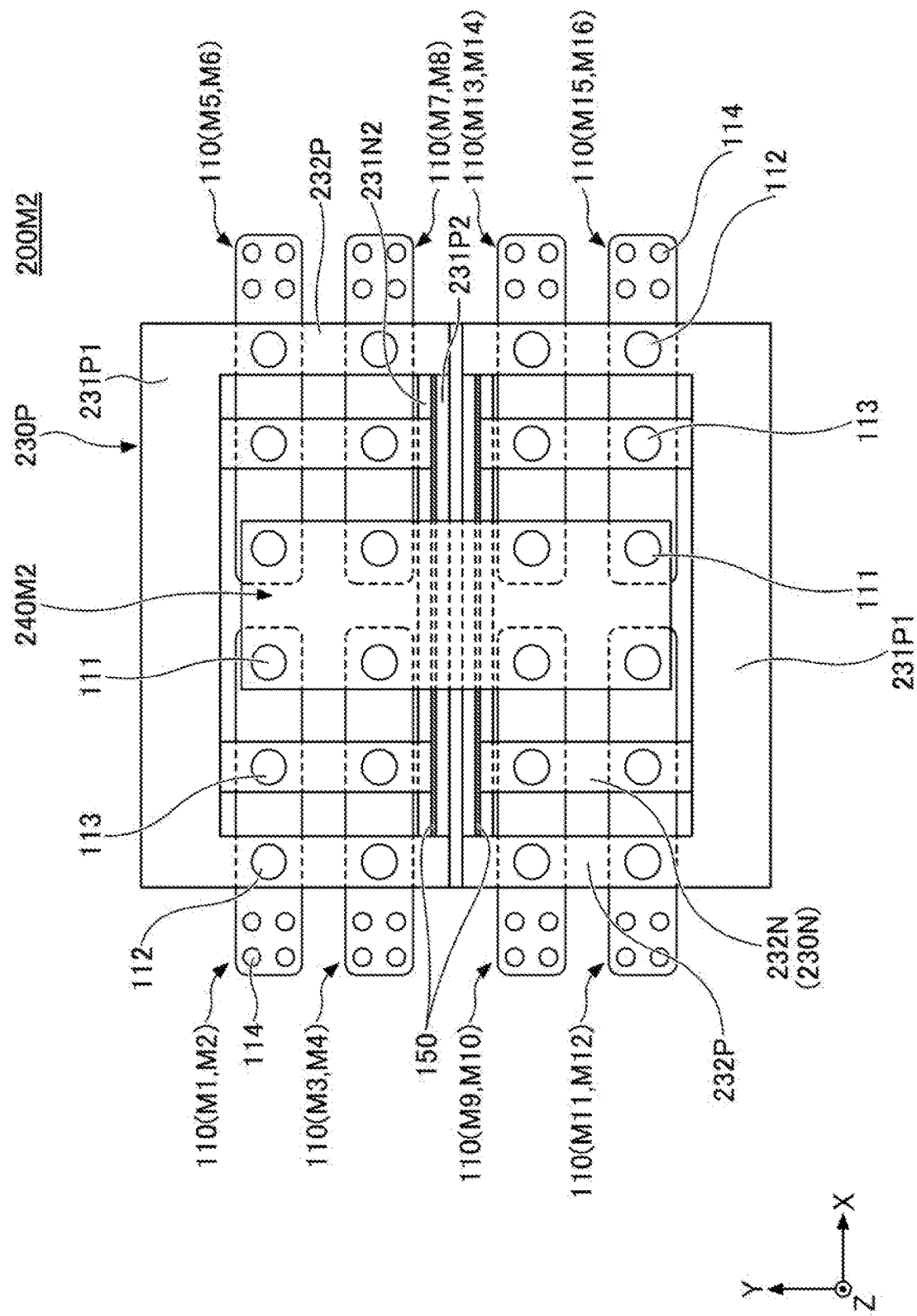
FIG. 10 is a plan view illustrating an example of the power conversion apparatus in a second modification of the second embodiment.

FIG. 10 is a plan view illustrating a power conversion apparatus 200M2 in a second modification of the second embodiment. In FIG. 10, those parts that are the same as those corresponding parts in FIG. 5 through FIG. 8C are designated by the same reference numerals, and a description thereof will be omitted.

The power conversion apparatus 200M2 includes 8 semiconductor modules 110, a P-bar 230P, an N-bar 230N, and an output bar 240M2. The output bar 240M2 has a rectangular shape corresponding to the output bar 240 having the cutout parts 243 omitted.

In the power conversion apparatus 200M2, the P-bar 230P and the N-bar 230N respectively have the frame parts 231P2 and 231N2 folded at an intermediate part along the Y-axis direction, to shorten the length of the connecting part 244 of the output bar 240M2 along the Y-axis direction. Hence, the difference among the current paths can be reduced, to easily secure the tolerance with respect to the short-circuit current. It is possible to employ the configuration of the power conversion apparatus 100M2 in a case in which securing the tolerance with respect to the short-circuit current is unaffected even if a combination of the output bar 240M2, the P-bar 230P, and the N-bar 230N is used.

According to each of the embodiments and the modifications described above, it is possible to provide a power conversion apparatus which can easily secure tolerance with respect to the short-circuit current.

Although the embodiments are numbered with, for example, "first," or "second," the ordinal numbers do not imply priorities of the embodiments. Many other variations and modifications will be apparent to those skilled in the art.

Further, the present invention is not limited to these embodiments, and various variations, modifications, and substitutions may be made without departing from the scope of the present invention.

What is claimed is:

1. A power conversion apparatus comprising:
a first semiconductor module, a second semiconductor module, a third semiconductor module, and a fourth semiconductor module respectively including
a module body, made of an insulator, having a rectangular shape in a plan view, and arranged in an array of two rows by two columns along two mutually perpendicular directions in the plan view,
a switch part including a first semiconductor switch and a second semiconductor switch that are coupled in series, and
an output terminal coupled to a node that electrically connects the first semiconductor switch and the second semiconductor switch,
wherein four output terminals of the first, second, third, and fourth semiconductor modules are arranged in an array of two rows by two columns along two mutually perpendicular directions in the plan view;
an output bar having an approximate X-shape in the plan view, and configured to electrically connect the four output terminals of the first, second, third, and fourth semiconductor modules via four tip ends of the approximate X-shape, so that a length of a current path of the output bar electrically connecting any two output terminals among the four output terminals is approximately constant;
a first-potential-side bar, having a rectangular picture-frame shape in the plan view, configured to electrically connect four first-potential-side terminals that are respectively electrically connected to the first semiconductor switch of the first, second, third, and fourth semiconductor modules;
a second-potential-side bar, disposed on the module body of each of the first, second, third, and fourth semiconductor modules and arranged to overlap the first-potential-side bar in the plan view, and configured to electrically connect four second-potential-side terminals that are respectively electrically connected to the second semiconductor switch of the first, second, third, and fourth semiconductor modules; and
an insulating part configured to insulate the first-potential-side bar and the second-potential-side bar from each other, wherein
the second-potential-side bar has a shape including upper and lower arms overlapping upper and lower arms of the first-potential-side bar in the plan view, and right and left arms located at positions not overlapping right and left arms of the first-potential-side bar in the plan view,
the insulating part is disposed between the upper arms of the first-potential-side bar and the second-potential-side bar, and between the lower arms of the first-potential-side bar and the second-potential-side bar, thereby being sandwiched between the first-potential-side bar and the second-potential-side bar,
the module body arranged in the array of two rows by two columns is disposed between the first-potential-side bar and the second-potential-side bar in the plan view, and
the output bar having the approximate X-shape is disposed on the module body of each of the first, second, third, and fourth semiconductor modules at a center portion of the first-potential-side bar and the second-potential-side bar, surrounded by the upper and lower arms of the first-potential-side bar and the second-potential-side bar and the right and left arms of the second-potential-side bar in the plan view, thereby electrically connecting the four output terminals of the first, second, third, and fourth semiconductor modules.

2. The power conversion apparatus as claimed in claim 1, wherein the four output terminals are arranged at positions corresponding to vertexes of a square shape in the plan view, and aligned to the four tip ends of the approximate X-shape of the output bar.

3. The power conversion apparatus as claimed in claim 1, further comprising:
   a DC power source electrically connected between the first-potential-side bar and the second-potential-side bar.

4. The power conversion apparatus as claimed in claim 1, further comprising:
   a capacitor electrically connected between the first-potential-side bar and the second-potential-side bar.

5. The power conversion apparatus as claimed in claim 1, wherein
   each of the first, second, third, and fourth semiconductor modules includes an insulator body having a surface on which a corresponding one of the four output terminals, a corresponding one of the four first-potential-side terminals, and a corresponding one of the four second-potential-side terminals are provided,
   the four output terminals are arranged closer to each other than the four first-potential-side terminals, and
   the four output terminals are arranged closer to each other than the four second-potential-side terminals.

6. The power conversion apparatus as claimed in claim 5, wherein each of the first, second, third, and fourth semiconductor modules includes four driving terminals, provided on the surface of the insulator body, and configured to electrically connect to and drive one of the first and second semiconductor switches of each of the first, second, third, and fourth semiconductor modules in response to external signals applied thereto.

7. A power conversion apparatus comprising:
   a first semiconductor module, a second semiconductor module, a third semiconductor module, and a fourth semiconductor module respectively including
      a module body, made of an insulator, having a rectangular shape in a plan view, and arranged in an array of two rows by two columns along two mutually perpendicular directions in the plan view,
      a switch part including a first semiconductor switch and a second semiconductor switch that are coupled in series, and
      an output terminal coupled to a node that connects the first semiconductor switch and the second semiconductor switch,
      wherein four output terminals of the first, second, third, and fourth semiconductor modules are arranged in an array of two rows by two columns along two mutually perpendicular directions in the plan view;
   an output bar having an approximate X-shape in the plan view, and configured to electrically connect the four output terminals of the first, second, third, and fourth semiconductor modules via four tip ends of the approximate X-shape, so that parasitic inductances of current paths of the output bar, electrically connecting two output terminals of each of combinations of two semiconductor modules among the first, second, third, and fourth modules, respectively, are approximately balanced;
   a first-potential-side bar, having a rectangular picture-frame shape in the plan view, configured to electrically connect four first-potential-side terminals that are respectively electrically connected to the first semiconductor switch of the first, second, third, and fourth semiconductor modules;
   a second-potential-side bar, disposed on the module body of each of the first, second, third, and fourth semiconductor modules and arranged to overlap the first-potential-side bar in the plan view, and configured to electrically connect four second-potential-side terminals that are respectively electrically connected to the second semiconductor switch of the first, second, third, and fourth semiconductor modules; and
   an insulating part configured to insulate the first-potential-side bar and the second-potential-side bar from each other, wherein
   the second-potential-side bar has a shape including upper and lower arms overlapping upper and lower arms of the first-potential-side bar in the plan view, and right and left arms located at positions not overlapping right and left arms of the first-potential-side bar in the plan view,
   the insulating part is disposed between the upper arms of the first-potential-side bar and the second-potential-side bar, and between the lower arms of the first-potential-side bar and the second-potential-side bar, thereby being sandwiched between the first-potential-side bar and the second-potential-side bar,
   the module body arranged in the array of two rows by two columns is disposed between the first-potential-side bar and the second-potential-side bar in the plan view, and
   the output bar having the approximate X-shape is disposed on the module body of each of the first, second, third, and fourth semiconductor modules at a center portion of the first-potential-side bar and the second-potential-side bar, surrounded by the upper and lower arms of the first-potential-side bar and the second-potential-side bar and the right and left arms of the second-potential-side bar in the plan view, thereby electrically connecting the four output terminals of the first, second, third, and fourth semiconductor modules.

8. A power conversion apparatus comprising:
   a first semiconductor module, a second semiconductor module, a third semiconductor module, and a fourth semiconductor module respectively including
      a switch part including a first semiconductor switch and a second semiconductor switch that are coupled in series, and
      an output terminal coupled to a node that electrically connects the first semiconductor switch and the second semiconductor switch,
      wherein four output terminals of the first, second, third, and fourth semiconductor modules are arranged in an array of two rows by two columns along two mutually perpendicular directions in a plan view;
   an output bar having an approximate X-shape in the plan view, and configured to electrically connect the four output terminals of the first, second, third, and fourth semiconductor modules via four tip ends of the approximate X-shape, so that a length of a current path of the output bar electrically connecting any two output terminals among the four output terminals is approximately constant;
   a first-potential-side bar configured to electrically connect four first-potential-side terminals that are respectively electrically connected to the first semiconductor switch of the first, second, third, and fourth semiconductor modules;

a second-potential-side bar, arranged to overlap the first-potential-side bar in the plan view, and configured to electrically connect four second-potential-side terminals that are respectively electrically connected to the second semiconductor switch of the first, second, third, and fourth semiconductor modules; and an insulating part configured to insulate the first-potential-side bar and the second-potential-side bar from each other, wherein the first, second, third, and fourth semiconductor modules are aligned in a longitudinal direction and a lateral direction in the plan view respectively corresponding to the two mutually perpendicular directions in the plan view, the output bar is provided along the lateral direction, the first-potential-side bar includes a first first-potential-side frame part extending in the longitudinal direction on an outer side of the first, second, third, and fourth semiconductor modules at a first side along the lateral direction, a second first-potential-side frame part extending in the longitudinal direction on the outer side of the first, second, third, and fourth semiconductor modules at a second side along the lateral direction, a first-potential-side intermediate frame part extending in the longitudinal direction between the first first-potential-side frame part and the second first-potential-side frame part, and provided between adjacent semiconductor modules among the first, second, third, and fourth semiconductor modules in the plan view, and a first potential-side connecting part extending in the lateral direction and connecting the first first-potential-side frame part, the second first-potential-side frame part, and the first-potential-side intermediate frame part, and configured to electrically connect the four first-potential-side terminals of the first, second, third, and fourth semiconductor modules, and the second-potential-side bar includes a first second-potential-side frame part extending in the longitudinal direction on the outer side of the first, second, third, and fourth semiconductor modules at the first side, and arranged to overlap the first first-potential-side frame part in the plan view via the insulating part, a second second-potential-side frame part extending in the longitudinal direction on the outer side of the first, second, third, and fourth semiconductor modules at the second side, and arranged to overlap the second first-potential-side frame part in the plan view via the insulating part, a second-potential-side intermediate frame part extending in the longitudinal direction between the first second-potential-side frame part and the second second-potential-side frame part, provided between the adjacent semiconductor modules in the plan view, and arranged to overlap the first-potential-side intermediate frame part in the plan view via the insulating part, and a second potential-side connecting part extending in the lateral direction and connecting the first second-potential-side frame part, the second second-potential-side frame part, and the second-potential-side intermediate frame part, and configured to electrically connect the four second-potential-side terminals of the first, second, third, and fourth semiconductor modules.

9. The power conversion apparatus as claimed in claim 8, wherein a size of the first-potential-side bar in the plan view, a size of the second-potential-side bar in the plan view, and a distance separating the first-potential-side bar and the second-potential-side bar are set to cancel effects of a parasitic inductance when an AC power is supplied to the first-potential-side bar and the second-potential-side bar.

10. The power conversion apparatus as claimed in claim 1, wherein each of the first, second, third, and fourth semiconductor modules includes the first-potential-side terminals and the second-potential-side terminals that are provided on the module body, the right and left arms of the first-potential-side bar include holes located at positions overlapping the first-potential-side terminals in the plan view, and the right and left arms of the second-potential-side bar include holes located at positions overlapping the second-potential-side terminals in the plan view.

11. The power conversion apparatus as claimed in claim 7, wherein each of the first, second, third, and fourth semiconductor modules includes the first-potential-side terminals and the second-potential-side terminals that are provided on the module body, the right and left arms of the first-potential-side bar include holes located at positions overlapping the first-potential-side terminals in the plan view, and the right and left arms of the second-potential-side bar include holes located at positions overlapping the second-potential-side terminals in the plan view.

\* \* \* \* \*